United States Patent
Kita et al.

(10) Patent No.: US 11,764,405 B2
(45) Date of Patent: Sep. 19, 2023

(54) LITHIUM ION SECONDARY BATTERY ELEMENT INCLUDING NEGATIVE ELECTRODE WITH NEGATIVE ELECTRODE ACTIVE MATERIAL LAYER TAPERED PART HAVING SMALLER DENSITY THAN NEGATIVE ELECTRODE ACTIVE MATERIAL LAYER FLAT PART

(71) Applicant: Envision AESC Japan Ltd., Kanagawa (JP)

(72) Inventors: Yosuke Kita, Kanagawa (JP); Aika Kimura, Kanagawa (JP); Toshihiro Horiuchi, Kanagawa (JP)

(73) Assignee: AESC Japan Ltd., Kanagawa (JP)

( * ) Notice: Subject to any disclaimer, the term of this patent is extended or adjusted under 35 U.S.C. 154(b) by 209 days.

(21) Appl. No.: 16/884,468

(22) Filed: May 27, 2020

(65) Prior Publication Data
US 2020/0381769 A1    Dec. 3, 2020

(30) Foreign Application Priority Data
May 29, 2019    (JP) .................................. 2019-100452

(51) Int. Cl.
*H01M 10/058*    (2010.01)
*H01M 10/0525*   (2010.01)
*H01M 4/02*      (2006.01)

(52) U.S. Cl.
CPC ..... *H01M 10/058* (2013.01); *H01M 10/0525* (2013.01); *H01M 2004/021* (2013.01)

(58) Field of Classification Search
CPC ......................... H01M 10/058; H01M 10/0525
(Continued)

(56) References Cited

U.S. PATENT DOCUMENTS

2006/0006063 A1* 1/2006 Tanaka ............... H01M 4/0435
                                                   29/25.03
2012/0214036 A1* 8/2012 Kim .................... H01M 50/531
                                                      429/94
(Continued)

FOREIGN PATENT DOCUMENTS

EP      3413390 A1    12/2018
WO   2015/129320 A1    9/2015
(Continued)

OTHER PUBLICATIONS

Extended European Search Report issued in corresponding European Patent Application No. 20177215.9 dated Oct. 15, 2020.
(Continued)

*Primary Examiner* — Sean P Cullen
(74) *Attorney, Agent, or Firm* — Morgan, Lewis & Bockius LLP

(57) ABSTRACT

In a lithium ion secondary battery element, a positive electrode and a negative electrode are overlapped on each other so that a positive electrode active material layer with a generally rectangular shape in the positive electrode and a negative electrode active material layer with a generally rectangular shape in the negative electrode are overlapped on each other substantially perfectly and a positive electrode active material non-applied part of the positive electrode and a negative electrode active material non-applied part of the negative electrode are positioned on opposing sides of the rectangle. A border part between the negative electrode active material applied part and the negative electrode active material non-applied part is positioned closer to a peripheral side of a negative electrode current collector than a peripheral part of a positive electrode current collector. A border part between a negative electrode active material layer flat part and a negative electrode active material layer thin part is positioned closer to a central side of the negative electrode (Continued)

current collector than the peripheral part of the positive electrode current collector. The negative electrode active material layer thin part has a density that is equal to or smaller than that of the negative electrode active material layer flat part.

20 Claims, 10 Drawing Sheets

(58) Field of Classification Search
USPC .......................................................... 429/209
See application file for complete search history.

(56) References Cited

U.S. PATENT DOCUMENTS

| | | | |
|---|---|---|---|
| 2013/0048340 A1* | 2/2013 | Bando | H01M 4/133 174/126.2 |
| 2015/0017523 A1 | 1/2015 | Hirai et al. | |
| 2015/0244017 A1* | 8/2015 | Nishinaka | H01M 50/531 429/233 |
| 2016/0359189 A1* | 12/2016 | Fukatsu | H01M 10/056 |
| 2018/0351211 A1* | 12/2018 | Kifune | H01M 4/139 |
| 2021/0210761 A1* | 7/2021 | Mimura | H01M 50/586 |

FOREIGN PATENT DOCUMENTS

| | | |
|---|---|---|
| WO | 2017/130821 A | 8/2017 |
| WO | 2017/163846 A1 | 9/2017 |

OTHER PUBLICATIONS

Office Action issued in European Patent Application No. 20177215.9 dated May 19, 2023.

* cited by examiner

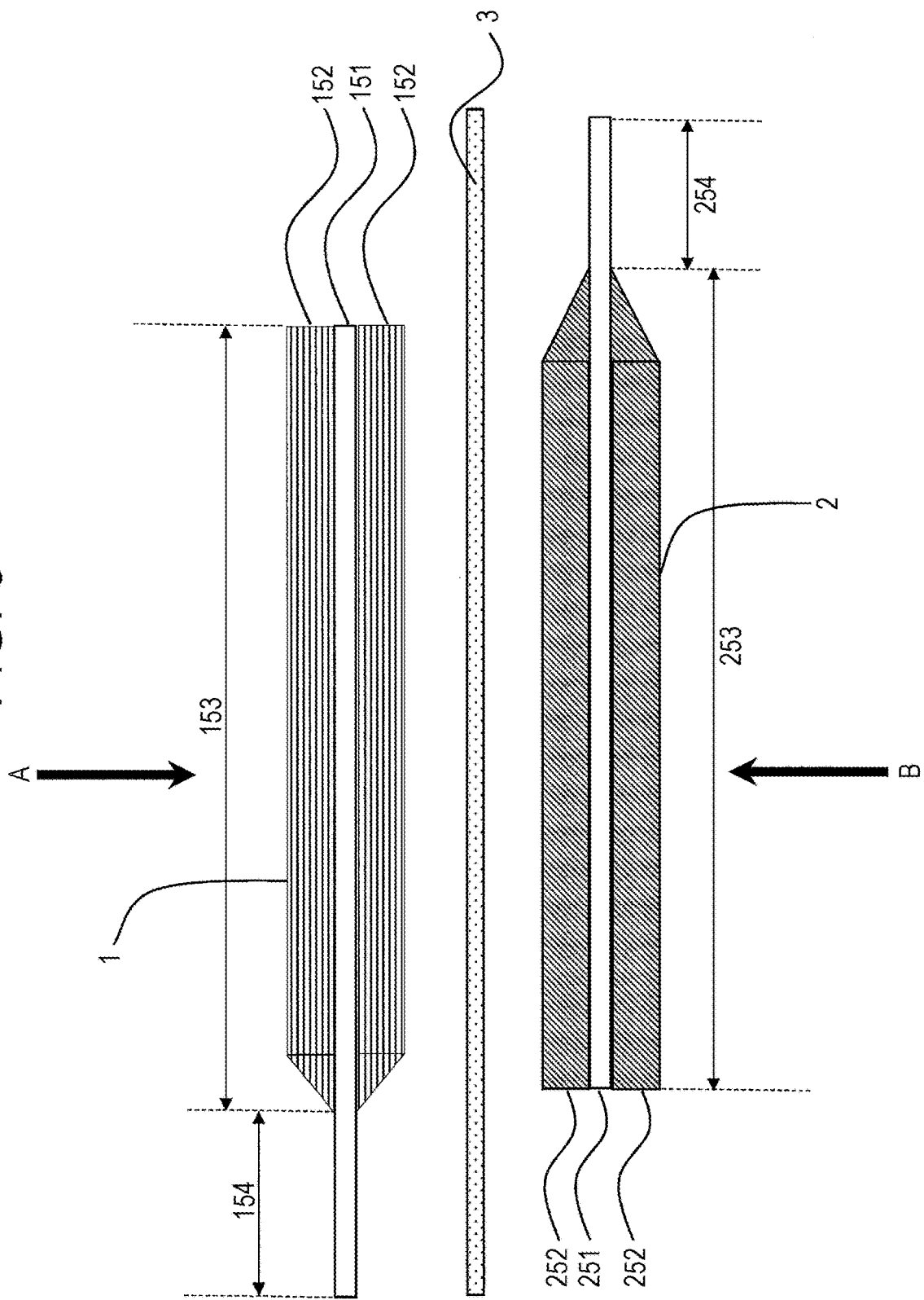

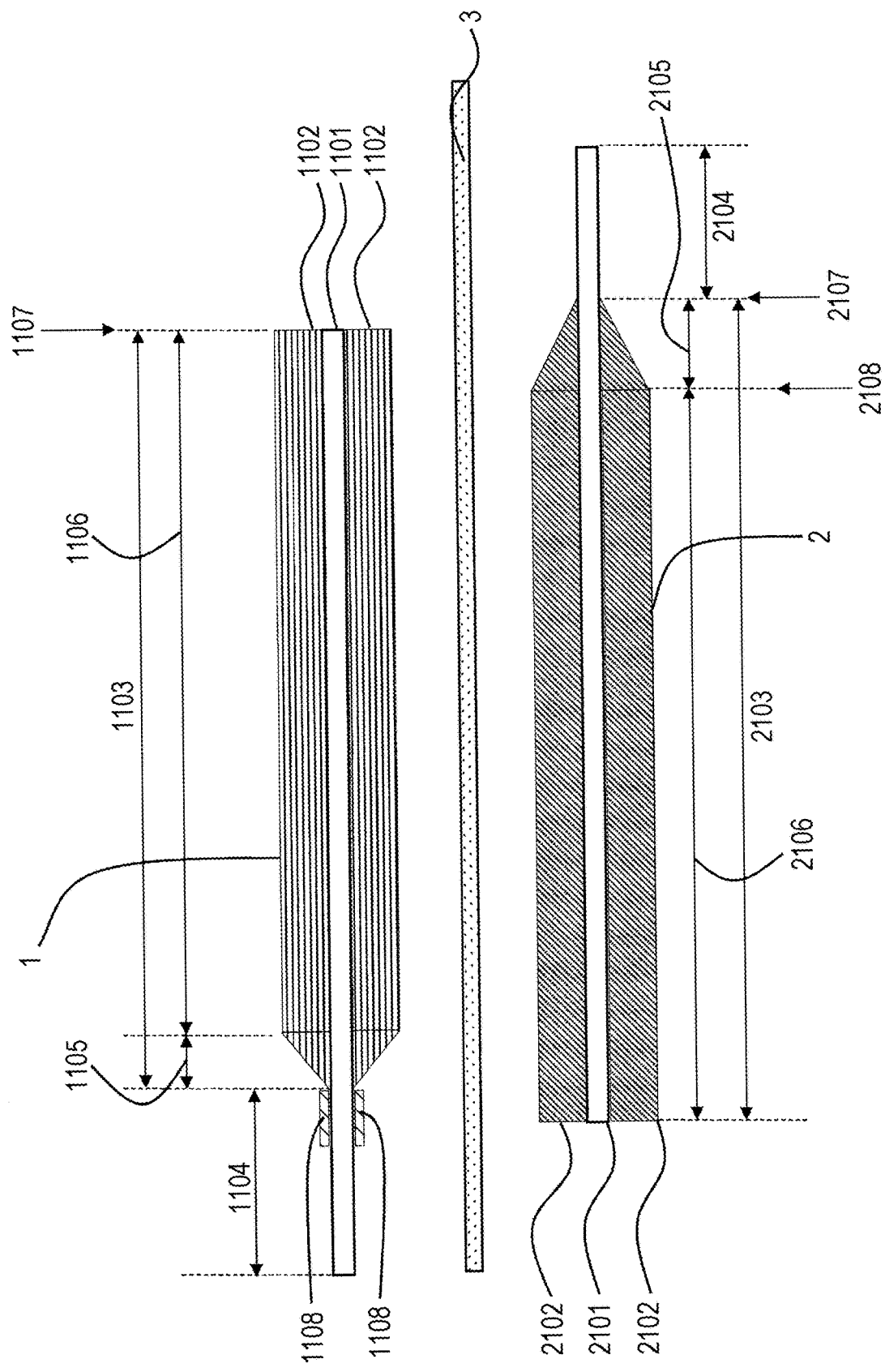

LITHIUM ION SECONDARY BATTERY ELEMENT INCLUDING NEGATIVE ELECTRODE WITH NEGATIVE ELECTRODE ACTIVE MATERIAL LAYER TAPERED PART HAVING SMALLER DENSITY THAN NEGATIVE ELECTRODE ACTIVE MATERIAL LAYER FLAT PART

CROSS-REFERENCE TO RELATED APPLICATION

This application claims priority from Japanese Patent Application No. 2019-100452 filed with the Japan Patent Office on May 29, 2019, the entire content of which is hereby incorporated by reference.

BACKGROUND

1. Technical Field

One embodiment of the present disclosure relates to a non-aqueous electrolyte battery, particularly a lithium ion secondary battery. Another embodiment of the present disclosure relates to a lithium ion secondary battery element that forms a non-aqueous electrolyte battery, and a method for manufacturing a lithium ion secondary battery element.

2. Related Art

Nonaqueous electrolyte batteries have been put into practical use as batteries for the on-vehicle power source for vehicles including hybrid vehicles and electric vehicles. One example of such batteries for the on-vehicle power source is a lithium ion secondary battery. The lithium ion secondary battery is required to have various characteristics such as output characteristic, energy density, capacity, lifetime, and high-temperature stability. In particular, improving the volume energy density of the battery for reducing the size of the battery is an urgent issue. In view of this, various improvements have been attempted regarding a battery structure including electrodes and an electrolyte solution.

WO 2015-129320 A has disclosed an electrode for a secondary battery. The electrode according to WO 2015-129320 A includes an active material layer applied part and an active material layer non-applied part. This electrode is characterized in that at least a part of an outer peripheral part of the applied part includes a high-density part with small thickness and high density.

SUMMARY

A lithium ion secondary battery element includes at least: a positive electrode including a positive electrode current collector and a positive electrode active material that is applied to at least a part of both surfaces of the positive electrode current collector so as to have substantially the same shape, the positive electrode current collector including a positive electrode active material layer with a generally rectangular shape, where the positive electrode active material is applied, and a positive electrode active material non-applied part where the positive electrode active material is not applied, the positive electrode active material non-applied part being positioned along at least a part of a peripheral part of the positive electrode current collector, the positive electrode active material layer including a positive electrode active material layer thin part and a positive electrode active material layer flat part; and a negative electrode including a negative electrode current collector and a negative electrode active material that is applied to at least a part of both surfaces of the negative electrode current collector so as to have substantially the same shape, the negative electrode current collector including a negative electrode active material applied part with a generally rectangular shape that is substantially the same as the shape of the positive electrode active material layer, where the negative electrode active material is applied, and a negative electrode active material non-applied part where the negative electrode active material is not applied, the negative electrode active material non-applied part being positioned along at least a part of a peripheral part of the negative electrode current collector, a negative electrode active material layer including a negative electrode active material layer thin part and a negative electrode active material layer flat part. The positive electrode and the negative electrode are overlapped on each other so that the positive electrode active material layer with the generally rectangular shape in the positive electrode and the negative electrode active material layer with the generally rectangular shape in the negative electrode are overlapped on each other substantially perfectly and the positive electrode active material non-applied part of the positive electrode and the negative electrode active material non-applied part of the negative electrode are positioned on opposing sides of the rectangle. A border part between the negative electrode active material applied part and the negative electrode active material non-applied part is positioned closer to a peripheral side of the negative electrode current collector than the peripheral part of the positive electrode current collector that is adjacent to the negative electrode active material non-applied part. A border part between the negative electrode active material layer flat part and the negative electrode active material layer thin part is positioned closer to a central side of the negative electrode current collector than the peripheral part of the positive electrode current collector that is adjacent to the negative electrode active material non-applied part. The negative electrode active material layer thin part has a density that is the same as or smaller than that of the negative electrode active material layer flat part.

BRIEF DESCRIPTION OF THE DRAWINGS

FIG. 5 is a cross-sectional view of a lithium ion secondary battery element according to a first embodiment in which the positive electrode and the negative electrode are overlapped on each other;

FIG. 10 is a cross-sectional view illustrating the lithium ion secondary battery element according to the first embodiment in a case where the positive electrode and the negative electrode are overlapped on each other so that a positive electrode active material non-applied part is adjacent to a negative electrode active material applied part.

DETAILED DESCRIPTION

Figure 1:
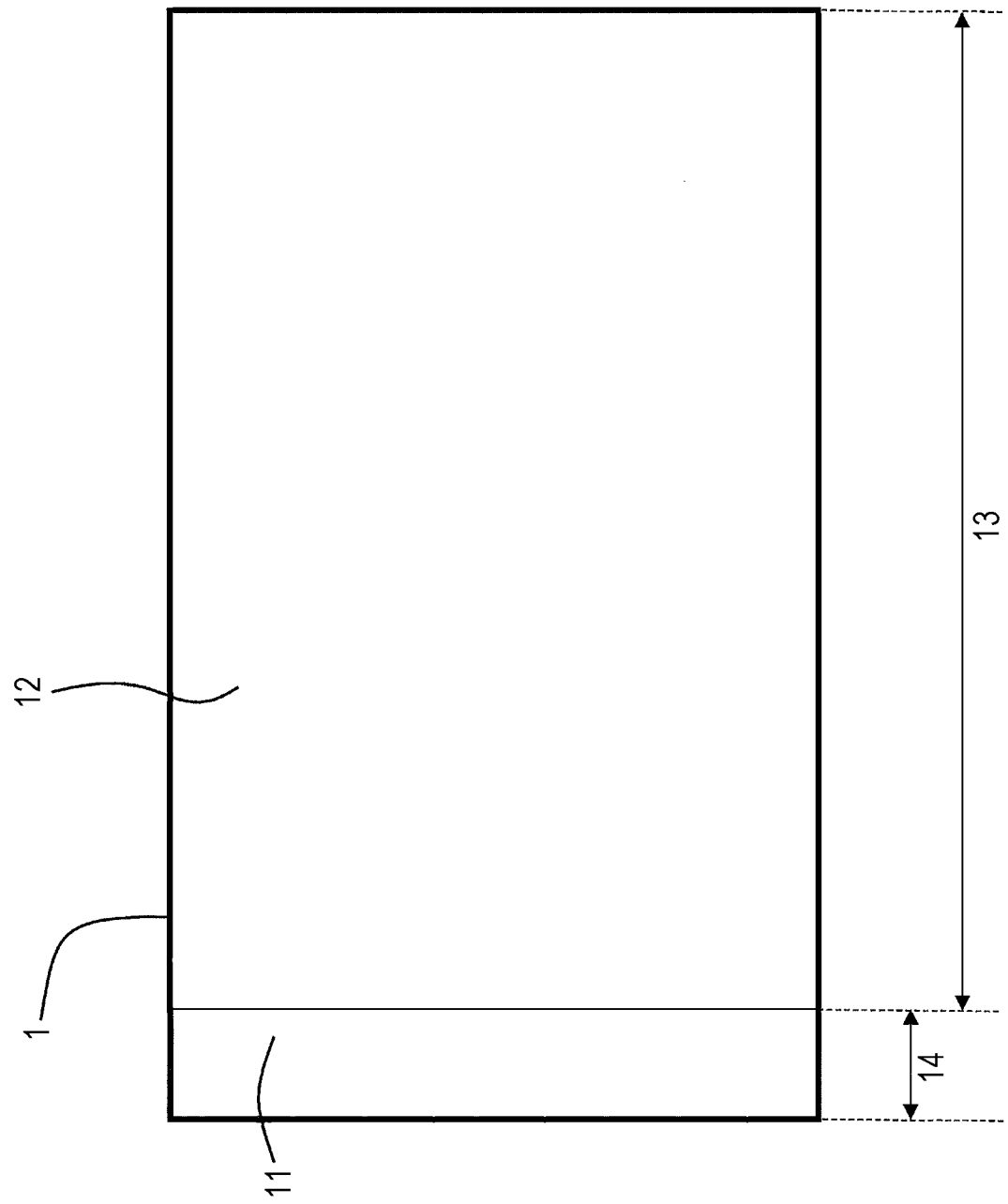
FIG. 1 is a plan view in which a positive electrode used in one embodiment is viewed from one surface.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The electrode suggested in WO 2015-129320 A includes the high-density part with small thickness and high density at the outer peripheral part of the active material applied part in order to suppress the formation of a locally swollen shape due to an insulating member that adheres to an end of the electrode. In WO 2015-129320 A, it is considered that a part of the negative electrode that overlaps with a place opposite to the insulating member provided to a positive electrode is not substantially involved in the operation of the battery. Therefore, in order to prevent lithium ions from entering this part, the high-density part is provided to the outer peripheral part of the negative electrode. When this high-density part is provided, however, this part is not involved in the operation of the battery. Thus, this provision contradicts the intention of increasing the energy density of the battery by enlarging the negative electrode.

One object of the present disclosure is to provide an element for a small lithium ion secondary battery with high energy density, and a lithium ion secondary battery with high capacity including this element.

A lithium ion secondary battery element according to one embodiment of the present disclosure includes at least: a positive electrode including a positive electrode current collector and a positive electrode active material that is applied to at least a part of both surfaces of the positive electrode current collector so as to have substantially the same shape, the positive electrode current collector including a positive electrode active material layer with a generally rectangular shape, where the positive electrode active material is applied, and a positive electrode active material non-applied part where the positive electrode active material is not applied, the positive electrode active material non-applied part being positioned along at least a part of a peripheral part of the positive electrode current collector, the positive electrode active material layer including a positive electrode active material layer thin part and a positive electrode active material layer flat part; and a negative electrode including a negative electrode current collector and a negative electrode active material that is applied to at least a part of both surfaces of the negative electrode current collector so as to have substantially the same shape, the negative electrode current collector including a negative electrode active material applied part with a generally rectangular shape that is substantially the same as the shape of the positive electrode active material layer, where the negative electrode active material is applied, and a negative electrode active material non-applied part where the negative electrode active material is not applied, the negative electrode active material non-applied part being positioned along at least a part of a peripheral part of the negative electrode current collector, a negative electrode active material layer including a negative electrode active material layer thin part and a negative electrode active material layer flat part. The positive electrode and the negative electrode are overlapped on each other so that the positive electrode active material layer with the generally rectangular shape in the positive electrode and the negative electrode active material layer with the generally rectangular shape in the negative electrode are overlapped on each other substantially perfectly.

Here, the positive electrode and the negative electrode are overlapped on each other so that the positive electrode active material non-applied part of the positive electrode and the negative electrode active material non-applied part of the negative electrode are positioned on opposite sides of the rectangle. A border part between the negative electrode active material applied part and the negative electrode active material non-applied part is positioned closer to the peripheral side of the negative electrode current collector than the peripheral part of the positive electrode current collector that is adjacent to the negative electrode active material non-applied part. A border part between the negative electrode active material layer flat part and the negative electrode active material layer thin part is positioned closer to a central side of the negative electrode current collector than the peripheral part of the positive electrode current collector that is adjacent to the negative electrode active material non-applied part. The density of the negative electrode active material layer thin part is the same as or smaller than that of the negative electrode active material layer flat part.

Further, a lithium ion secondary battery element according to another embodiment of the present disclosure includes at least: a positive electrode including a positive electrode current collector and a positive electrode active material that is applied to at least a part of both surfaces of the positive electrode current collector so as to have substantially the same shape, the positive electrode current collector including a positive electrode active material layer with a generally rectangular shape, where the positive electrode active material is applied, and a positive electrode active material non-applied part where the positive electrode active material is not applied, the positive electrode active material non-applied part being positioned along at least a part of a peripheral part of the positive electrode current collector, the positive electrode active material layer including a positive electrode active material layer thin part and a positive electrode active material layer flat part, the positive electrode further including an insulating member that covers at least a part of the positive electrode active material non-applied part; and a negative electrode including a negative electrode current collector and a negative electrode active material that is applied to at least a part of both surfaces of the negative electrode current collector so as to have substantially the same shape, the negative electrode current collector including a negative electrode active material applied part with a generally rectangular shape that is substantially the same as the shape of the positive electrode active material layer, where the negative electrode active material is applied, and a negative electrode active material non-applied part where the negative electrode active material is not applied, the negative electrode active material non-applied part being positioned along at least a part of a peripheral part of the negative electrode current collector, a negative electrode active material layer including a negative electrode active material layer thin part and a negative electrode active material layer flat part. The positive electrode and the negative electrode are overlapped on each other so that the positive electrode active material layer with the generally rectangular shape in the positive electrode and the negative electrode active material layer with the generally rectangular shape in the negative electrode are overlapped on each other substantially perfectly.

Here, the positive electrode active material non-applied part of the positive electrode and the negative electrode active material non-applied part of the negative electrode are positioned on the same side of the rectangle. The border part between the negative electrode active material applied part and the negative electrode active material non-applied part is positioned adjacent to the insulating member. The border part between the negative electrode active material layer thin part and the negative electrode active material layer flat part is positioned adjacent to the positive electrode active material layer flat part. The density of the negative electrode active material layer thin part is the same as or smaller than that of the negative electrode active material layer flat part.

Further, a method for manufacturing a lithium ion secondary battery element according to another embodiment of the present disclosure includes a step of overlapping a positive electrode including a positive electrode current collector and a positive electrode active material that is applied to at least a part of both surfaces of the positive electrode current collector so as to have substantially the same shape, and a negative electrode including a negative electrode current collector and a negative electrode active material that is applied to at least a part of both surfaces of the negative electrode current collector so as to have substantially the same shape. The step of overlapping the positive electrode and the negative electrode includes at least: a step of obtaining the positive electrode, the obtaining step including providing a positive electrode active material applied part with a generally rectangular shape and a positive electrode active material non-applied part positioned along at least a part of a peripheral part of the positive electrode current collector by applying a positive electrode active material-containing slurry including the positive electrode active material and a solvent continuously from a part of the positive electrode current collector in a predetermined direction, and pressing the entire positive electrode active material applied part generally uniformly with a predetermined amount of pressure so as to form a positive electrode active material layer thin part and a positive electrode active material layer flat part at the same time; a step of obtaining the negative electrode, the obtaining step including providing a negative electrode active material applied part with a generally rectangular shape that is substantially the same as the shape of the positive electrode active material applied part and a negative electrode active material non-applied part positioned along at least a part of a peripheral part of the negative electrode current collector by applying a negative electrode active material-containing slurry including the negative electrode active material and a solvent continuously from a part of the negative electrode current collector in a predetermined direction, and pressing the entire negative electrode active material applied part generally uniformly with a predetermined amount of pressure so as to form a negative electrode active material layer thin part and a negative electrode active material layer flat part at the same time, the negative electrode active material layer thin part having a density that is the same as or smaller than that of the negative electrode active material layer flat part; and a step of overlapping the positive electrode and the negative electrode so that a positive electrode active material layer with a generally rectangular shape in the positive electrode and a negative electrode active material layer with a generally rectangular shape in the negative electrode are overlapped on each other substantially perfectly, wherein the positive electrode active material non-applied part of the positive electrode and the negative electrode active material non-applied part of the negative electrode are positioned on opposing sides of the rectangle, a border part between the negative electrode active material applied part and the negative electrode active material non-applied part is positioned closer to a peripheral side of the negative electrode current collector than the peripheral part of the positive electrode current collector that is adjacent to the negative electrode active material non-applied part, and a border part between the negative electrode active material layer flat part and the negative electrode active material layer thin part is positioned closer to a central side of the negative electrode current collector than the peripheral part of the positive electrode current collector that is adjacent to the negative electrode active material non-applied part.

Further, a method for manufacturing a lithium ion secondary battery element according to another embodiment of the present disclosure includes a step of overlapping a positive electrode including a positive electrode current collector and a positive electrode active material that is applied to at least a part of both surfaces of the positive electrode current collector so as to have substantially the same shape, and a negative electrode including a negative electrode current collector and a negative electrode active material that is applied to at least a part of both surfaces of the negative electrode current collector so as to have substantially the same shape. The step of overlapping the positive electrode and the negative electrode includes at least: a step of obtaining the positive electrode, the obtaining step including providing a positive electrode active material applied part with a generally rectangular shape and a positive electrode active material non-applied part positioned along at least a part of a peripheral part of the positive electrode current collector by applying a positive electrode active material-containing slurry including the positive electrode active material and a solvent continuously from a part of the positive electrode current collector in a predetermined direction, pressing the entire positive electrode active material applied part generally uniformly with a predetermined amount of pressure so as to form a positive electrode active material layer thin part and a positive electrode active material layer flat part at the same time, and providing an insulating member so as to cover at least a part of the positive electrode active material non-applied part; a step of obtaining the negative electrode, the obtaining step including providing a negative electrode active material applied part with a generally rectangular shape that is substantially the same as the shape of the positive electrode active material applied part and a negative electrode active material non-applied part positioned along at least a part of a peripheral part of the negative electrode current collector by applying a negative electrode active material including the negative electrode active material and a solvent continuously from a part of the negative electrode current collector in a predetermined direction, and pressing the entire negative electrode active material applied part generally uniformly with a predetermined amount of pressure so as to form a negative electrode active material layer thin part and a negative electrode active material layer flat part at the same time, the negative electrode active material layer thin part having density that is the same as or smaller than that of the negative electrode active material layer flat part; and a step of overlapping the positive electrode and the negative electrode so that a positive electrode active material layer with a generally rectangular shape in the positive electrode and a negative electrode active material layer with a generally rectangular shape in the negative electrode are overlapped on each other substantially perfectly, wherein the positive electrode active material non-applied part of the positive electrode and the negative electrode active material non-applied part of the negative electrode are positioned on the same side of the rectangle, a border part between the negative electrode active material applied part and the negative electrode active material non-applied part is positioned adjacent to the insulating member, and a border part between the negative electrode active material layer thin part and the negative electrode active material layer flat part is positioned adjacent to the positive electrode active material layer flat part.

In the lithium ion secondary battery element according to the present disclosure, the density of the active material layers in the electrodes and the overlapping of the members are controlled so as to make the charging capacity ratio between the positive electrode and the negative electrode suitable. Thus, the deposition of metal lithium can be suppressed. Accordingly, the battery having the high energy density with the safety maintained can be provided.

Embodiments of the present disclosure are described below with reference to the attached drawings. A lithium ion secondary battery element according to a first embodiment includes a positive electrode. The positive electrode includes a positive electrode current collector, and a positive electrode active material that is applied to at least a part of both surfaces of this positive electrode current collector so as to have substantially the same shape. Here, the positive electrode current collector includes a positive electrode active material layer with a generally rectangular shape, where the positive electrode active material is applied, and a positive electrode active material non-applied part where the positive electrode active material is not applied. The positive electrode active material non-applied part is positioned along at least a part of a peripheral part of the positive electrode current collector. Moreover, the positive electrode active material layer includes a positive electrode active material layer thin part, and a positive electrode active material layer flat part.

In the embodiment, the positive electrode is a battery member with a thin plate shape or a sheet shape. The positive electrode is formed by applying or rolling and drying the positive electrode active material layer on the positive electrode current collector such as a metal foil. That is to say, the positive electrode includes the positive electrode current collector and the positive electrode active material layer including the positive electrode active material that is applied to both surfaces of the positive electrode current collector. In the present specification, the term "positive electrode active material" may mean a mixture of the positive electrode active material with the original meaning, which serves to conduct electricity in charging and discharging the battery, a binder, and a conductive agent that is used when necessary. When two surfaces of the positive electrode current collector are viewed from the respective surface sides, the positive electrode active material does not need to be applied to the entire surface of the positive electrode current collector and it is only necessary that the positive electrode active material is applied to at least a part thereof. Preferably, the positive electrode current collector includes the positive electrode active material layer with a generally rectangular shape, where the positive electrode active material is applied, and the positive electrode active material non-applied part where the positive electrode active material is not applied.

In the embodiment, the expression "the positive electrode active material is applied so as to have substantially the same shape" means both "when two surfaces of the positive electrode current collector are viewed from the respective surface sides, the positive electrode active materials are disposed to have substantially the same shape" and "when the cross section of the positive electrode is viewed, the positive electrode active materials are disposed to have the substantially symmetric shape along the positive electrode current collector".

The positive electrode active material layer may include a positive electrode active material layer thin part in which the positive electrode active material is thin, and a positive electrode active material layer flat part in which the positive electrode active material is applied with substantially uniform thickness. The positive electrode active material layer thin part and the positive electrode active material layer flat part may be positioned at any place in the positive electrode active material layer. For example, the positive electrode active material layer thin part can be positioned at a peripheral part of the positive electrode active material layer. The positive electrode active material layer may become thinner gradually toward a border part between the positive electrode active material applied part and the positive electrode active material non-applied part. That is to say, the positive electrode active material layer thin part may be formed in a manner that the positive electrode active material layer becomes thinner gradually toward the border part between the positive electrode active material applied part and the positive electrode active material non-applied part. In addition, the shape of the positive electrode active material layer is generally rectangular. Here, the term "generally rectangular" means that when two surfaces of the positive electrode current collector are viewed from the respective surface sides, the shape of the positive electrode active material layer is a tetragon (for example, rectangular, square, rhomboid, or parallelogram). The structure of the positive electrode is described below with reference to the drawing. Note that it is preferable that the shape of the positive electrode current collector provided with the positive electrode active material layer be also generally rectangular. Alternatively, a current collector with an L-like shape, which is a rectangle having lost a part, may be used.

Figure 2:
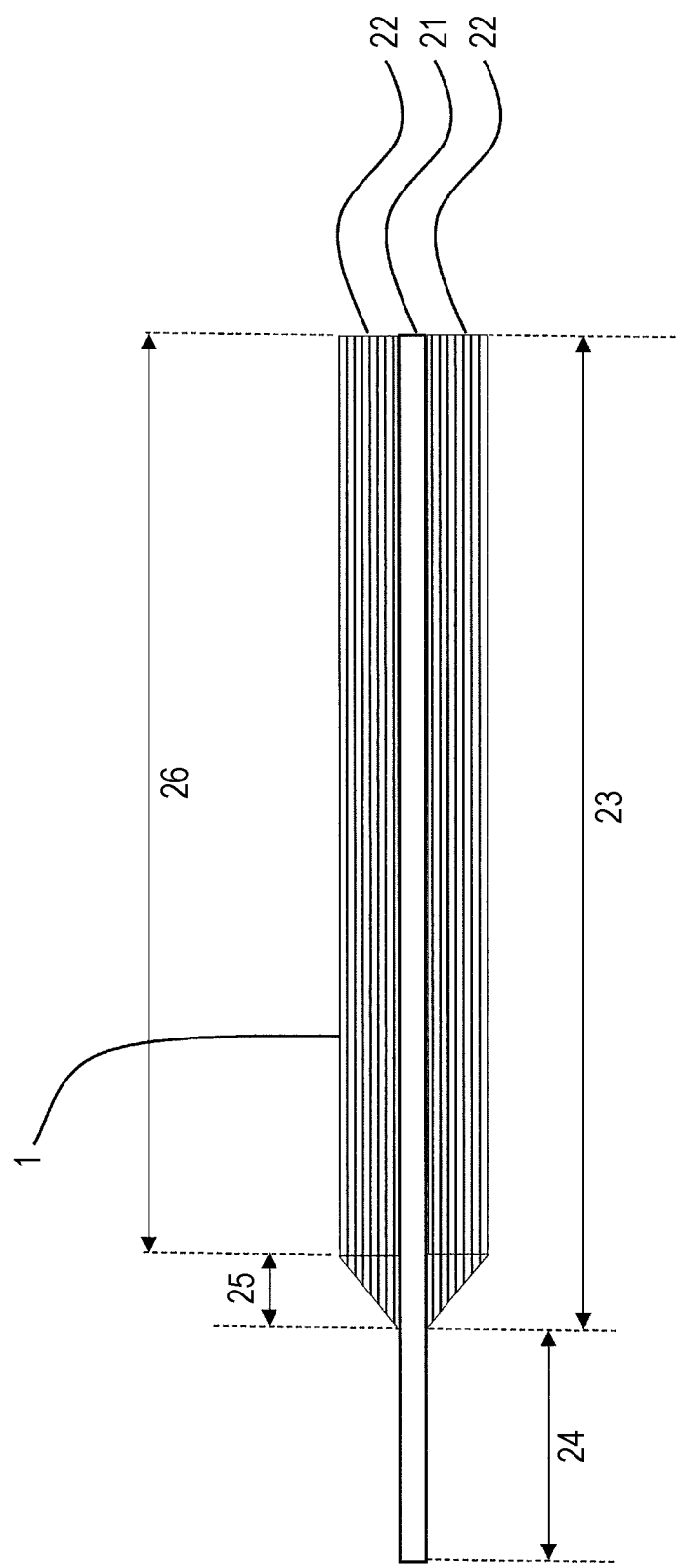
FIG. 2 is a cross-sectional view of the positive electrode used in the embodiment.

One representative structure of the positive electrode is described with reference to FIG. 1 and FIG. 2. FIG. 1 is a plan view in which the positive electrode is viewed from one surface. In FIG. 1, the positive electrode is denoted by 1, the positive electrode current collector is denoted by 11, the positive electrode active material layer is denoted by 12, the positive electrode active material applied part is denoted by 13, and the positive electrode active material non-applied part is denoted by 14. FIG. 2 is a cross-sectional view of the positive electrode. In FIG. 2, the positive electrode is denoted by 1, the positive electrode current collector is denoted by 21, the positive electrode active material layer is denoted by 22, the positive electrode active material applied part is denoted by 23, and the positive electrode active material non-applied part is denoted by 24.

In FIG. 1, the positive electrode active material is applied to one surface of the positive electrode current collector 11. Thus, the positive electrode active material layer 12 is formed. A part of the positive electrode current collector 11 where the positive electrode active material layer 12 is provided corresponds to the positive electrode active material applied part 13. A part of the positive electrode current collector 11 where the positive electrode active material layer 12 is not provided corresponds to the positive electrode active material non-applied part 14. As illustrated in FIG. 1, the positive electrode active material non-applied part 14 is positioned along a peripheral part of the positive electrode current collector 11. That is to say, in the structure illustrated in FIG. 1, the positive electrode active material layer 12 with a generally rectangular shape is provided to the positive electrode current collector 11 with the approximately rectangular shape. Along one side of the peripheral part of the positive electrode current collector 11, the positive electrode active material non-applied part 14 is provided. In the positive electrode 1 illustrated in FIG. 1, the positive electrode active material layer with substantially the same shape as the positive electrode active material layer 12 illustrated in FIG. 1 is also provided to the other surface of the positive electrode current collector 11 (back surface of the one surface, not shown).

On the other hand, as illustrated in FIG. 2, the positive electrode active material is applied to an upper surface of the positive electrode current collector 21. Thus, the positive electrode active material layer 22 is formed. The positive electrode active material is similarly applied to a lower surface of the positive electrode current collector 21, and thus, the positive electrode active material layer 22 is formed. On each surface, a part of the positive electrode current collector 21 where the positive electrode active material layer 22 is provided corresponds to the positive electrode active material applied part 23. A part of the positive electrode current collector 21 where the positive electrode active material layer 22 is not provided corresponds to the positive electrode active material non-applied part 24. As already described, in the present embodiment, the expression "the positive electrode active material is applied so as to have substantially the same shape" means "when the cross section of the positive electrode 1 is viewed, the positive electrode active material layer 22 is disposed to have the substantially symmetric shape along the positive electrode current collector 21".

The positive electrode active material layer may include a positive electrode active material layer thin part 25 and a positive electrode active material layer flat part 26. The positive electrode active material layer thin part 25 and the positive electrode active material layer flat part 26 may be positioned at any place in the positive electrode active material layer 22. For example, the positive electrode active material layer thin part 25 can be positioned at a peripheral part of the positive electrode active material layer 22. In the example illustrated in FIG. 2, the positive electrode active material layer thin part 25 is provided at the peripheral part of the positive electrode active material layer 22. In FIG. 2, the positive electrode active material layer thin part is denoted by 25, and the positive electrode active material layer flat part is denoted by 26. In FIG. 2, the positive electrode active material layer thin part 25 is a part formed so that the positive electrode active material layer 22 becomes thinner gradually toward a border part between the positive electrode active material applied part 23 and the positive electrode active material non-applied part 24.

The lithium ion secondary battery element according to the embodiment includes a negative electrode. The negative electrode includes a negative electrode current collector, and a negative electrode active material that is applied to at least a part of both surfaces of this negative electrode current collector so as to have substantially the same shape. Here, the negative electrode current collector includes a negative electrode active material applied part with a generally rectangular shape, where the negative electrode active material is applied and whose shape is substantially the same as that of the aforementioned positive electrode active material layer, and a negative electrode active material non-applied part where the negative electrode active material is not applied. The negative electrode active material non-applied part is positioned along at least a part of a peripheral part of the negative electrode current collector. Moreover, the negative electrode active material layer includes a negative electrode active material layer thin part, and a negative electrode active material layer flat part.

In the embodiment, the negative electrode is a battery member with a thin plate shape or a sheet shape. The negative electrode is formed by applying or rolling and drying the negative electrode active material layer on the negative electrode current collector such as a metal foil. That is to say, the negative electrode includes the negative electrode current collector and the negative electrode active material layer including the negative electrode active material that is applied to both surfaces of the negative electrode current collector. In the present specification, the term "negative electrode active material" may mean a mixture of the negative electrode active material that serves to conduct electricity in the battery, a binder, and a conductive agent that is used when necessary. When two surfaces of the negative electrode current collector are viewed from the respective surface sides, the negative electrode active material does not need to be applied to the entire surface of the negative electrode current collector and it is only necessary that the negative electrode active material is applied to at least a part thereof. Preferably, the negative electrode current collector includes the negative electrode active material layer with a generally rectangular shape, where the negative electrode active material is applied, and the negative electrode active material non-applied part where the negative electrode active material is not applied.

In the embodiment, the expression "the negative electrode active material is applied so as to have substantially the same shape" means both "when two surfaces of the negative electrode current collector are viewed from the respective surface sides, the negative electrode active materials are disposed to have substantially the same shape" and "when the cross section of the negative electrode is viewed, the negative electrode active materials are disposed to have the substantially symmetric shape along the negative electrode current collector".

The negative electrode active material layer may include a negative electrode active material layer thin part in which the negative electrode active material is thin, and a negative electrode active material layer flat part in which the negative electrode active material is applied with substantially uniform thickness. The negative electrode active material layer thin part and the negative electrode active material layer flat part may be positioned at any place in the negative electrode active material layer. For example, the negative electrode active material layer thin part can be positioned at a peripheral part of the negative electrode active material layer. The negative electrode active material layer may become thinner gradually toward a border part between the negative electrode active material applied part and the negative electrode active material non-applied part. That is to say, the negative electrode active material layer thin part may be formed in a manner that the negative electrode active material layer becomes thinner gradually toward the border part between the negative electrode active material applied part and the negative electrode active material non-applied part. In addition, the shape of the negative electrode active material layer is generally rectangular. Here, the term "generally rectangular" means that when two surfaces of the negative electrode current collector are viewed from the respective surface sides, the shape of the negative electrode active material layer is a tetragon (for example, rectangular, square, rhomboid, or parallelogram). The structure of the negative electrode is described below with reference to the drawing. Note that it is preferable that the shape of the negative electrode current collector provided with the negative electrode active material layer be also generally rectangular. Alternatively, a current collector with an L-like shape, which is a rectangle having lost a part, may be used.

Figure 3:
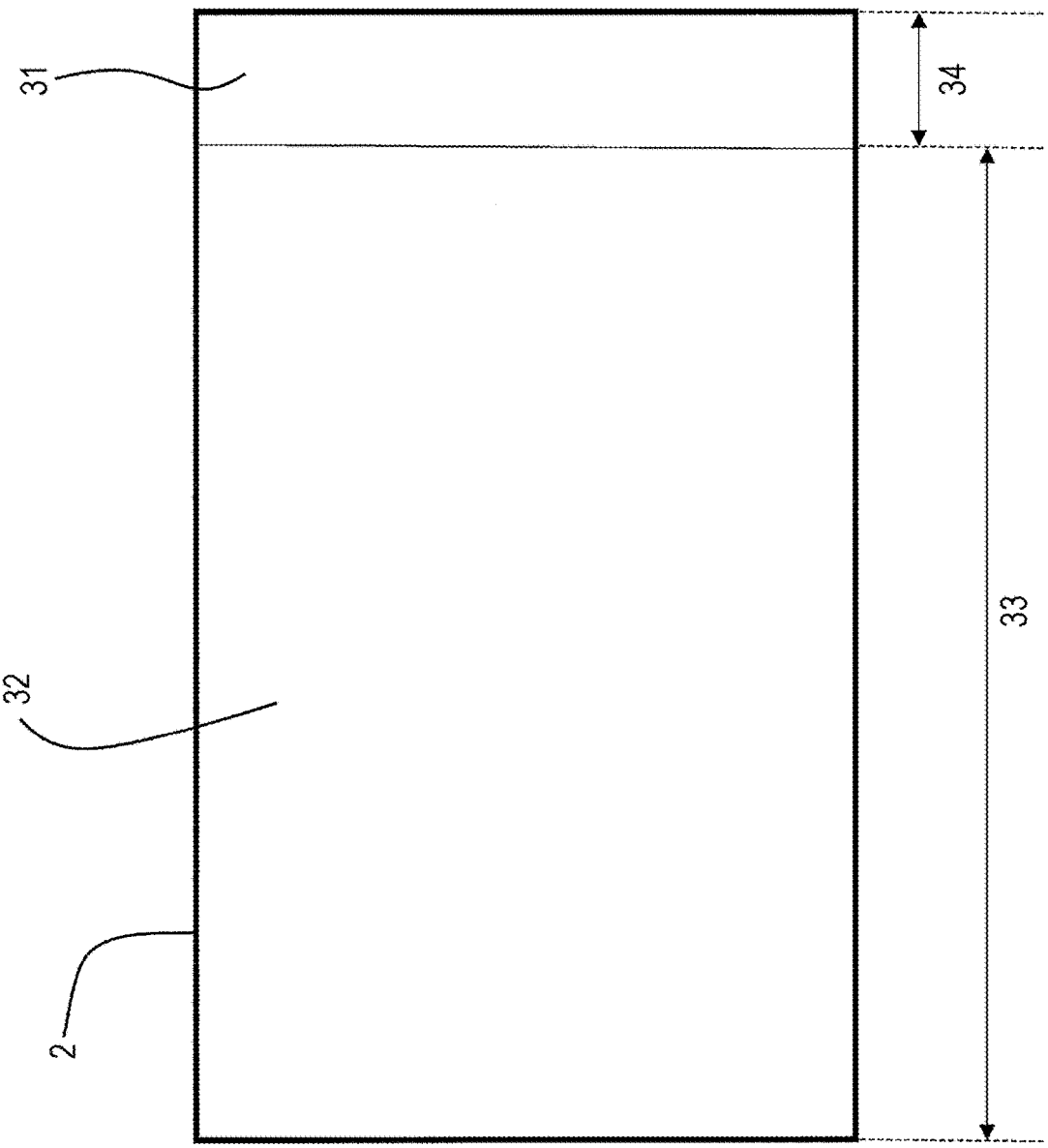
FIG. 3 is a plan view in which a negative electrode used in the embodiment is viewed from one surface.
Figure 4:
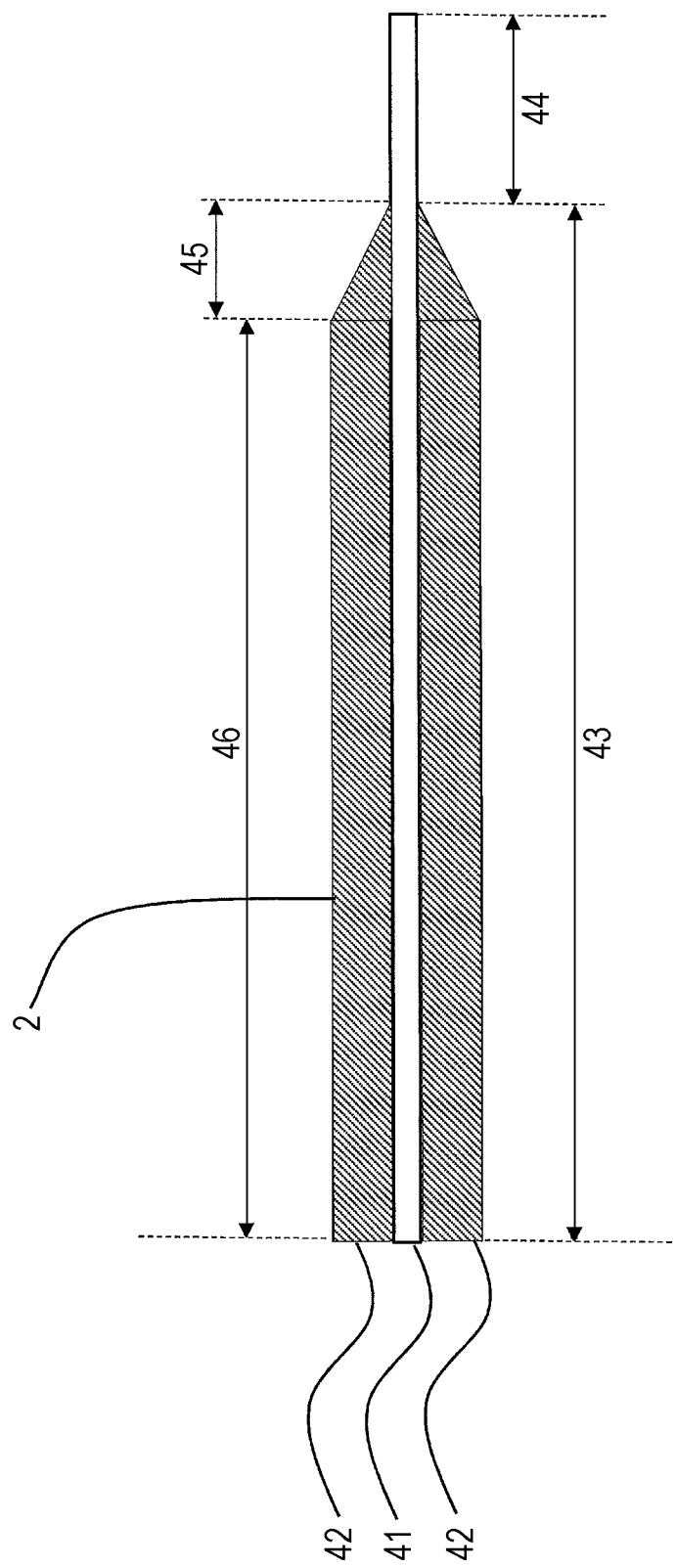
FIG. 4 is a cross-sectional view of the negative electrode used in the embodiment.

One representative structure of the negative electrode is described with reference to FIG. 3 and FIG. 4. FIG. 3 is a plan view in which the negative electrode is viewed from one surface. In FIG. 3, the negative electrode is denoted by 2, the negative electrode current collector is denoted by 31, the negative electrode active material layer is denoted by 32, the negative electrode active material applied part is denoted by 33, and the negative electrode active material non-applied part is denoted by 34. FIG. 4 is a cross-sectional view of the negative electrode. In FIG. 4, the negative electrode is denoted by 2, the negative electrode current collector is denoted by 41, the negative electrode active material layer is denoted by 42, the negative electrode active material applied part is denoted by 43, and the negative electrode active material non-applied part is denoted by 44.

As illustrated in FIG. 3, the negative electrode active material is applied to one surface of the negative electrode current collector 31. Thus, the negative electrode active material layer 32 is formed. A part of the negative electrode current collector 31 where the negative electrode active material layer 32 is provided corresponds to the negative electrode active material applied part 33. A part of the negative electrode current collector 31 where the negative electrode active material layer 32 is not provided corresponds to the negative electrode active material non-applied part 34. As illustrated in FIG. 3, the negative electrode active material non-applied part 34 is positioned along a peripheral part of the negative electrode current collector 31. That is to say, in the structure illustrated in FIG. 3, the negative electrode active material layer 32 with a generally rectangular shape is provided to the negative electrode current collector 31 with the approximately rectangular shape. Along one side of the peripheral part of the negative electrode current collector 31, the negative electrode active material non-applied part 34 is provided. In the negative electrode 2 illustrated in FIG. 3, the negative electrode active material layer with substantially the same shape as the negative electrode active material layer 32 illustrated in FIG. 3 is also provided to the other surface of the negative electrode current collector 31 (back surface of the one surface, not shown).

On the other hand, as illustrated in FIG. 4, the negative electrode active material is applied to an upper surface of the negative electrode current collector 41. Thus, the negative electrode active material layer 42 is formed. The negative electrode active material is similarly applied to a lower surface of the negative electrode current collector 41, and thus, the negative electrode active material layer 42 is formed. On each surface, a part of the negative electrode current collector 41 where the negative electrode active material layer 42 is provided corresponds to the negative electrode active material applied part 43. A part of the negative electrode current collector 41 where the negative electrode active material layer 42 is not provided corresponds to the negative electrode active material non-applied part 44. As already described, in the present embodiment, the expression "the negative electrode active material is applied so as to have substantially the same shape" means "when the cross section of the negative electrode 2 is viewed, the negative electrode active material layer 42 is disposed to have the substantially symmetric shape along the negative electrode current collector 41".

The negative electrode active material layer may include a negative electrode active material layer thin part 45 and a negative electrode active material layer flat part 46. The negative electrode active material layer thin part 45 and the negative electrode active material layer flat part 46 may be positioned at any place in the negative electrode active material layer 42. For example, the negative electrode active material layer thin part 45 can be positioned at a peripheral part of the negative electrode active material layer 42. In the example illustrated in FIG. 4, the negative electrode active material layer thin part 45 is provided at the peripheral part of the negative electrode active material layer 42. In FIG. 4, the negative electrode active material layer thin part is denoted by 45, and the negative electrode active material layer flat part is denoted by 46. In FIG. 4, the negative electrode active material layer thin part 45 is a part formed so that the negative electrode active material layer 42 becomes thinner gradually toward a border part between the negative electrode active material applied part 43 and the negative electrode active material non-applied part 44.

In the lithium ion secondary battery element according to the embodiment, the positive electrode and the negative electrode are overlapped on each other so that the positive electrode active material layer with a generally rectangular shape in the positive electrode and the negative electrode active material layer with a generally rectangular shape in the negative electrode substantially overlap each other. The expression "the positive electrode and the negative electrode are overlapped on each other so that the generally rectangular shape of the positive electrode active material layer in the positive electrode and the generally rectangular shape of negative electrode active material layer in the negative electrode substantially overlap each other" means that the positive electrode and the negative electrode are overlapped on each other so that each side of the positive electrode active material layer with a generally rectangular shape and each side of the negative electrode active material layer with a generally rectangular shape substantially overlap each other. For example, when the shape of the positive electrode active material layer is a rectangle, the shape of the negative electrode active material layer is also a substantially identical rectangle. The positive electrode and the negative electrode can overlap each other so that the long side of the rectangle of the positive electrode active material layer and the long side of the negative electrode active material layer generally coincide with each other. Here, the shape of the positive electrode active material layer and the shape of the negative electrode active material layer do not have to be exactly the same. Moreover, the positive electrode and the negative electrode do not have to overlap each other so that the positive electrode active material layer and the negative electrode active material layer are overlapped perfectly. It is only necessary that the rectangle of the positive electrode active material layer and the rectangle of the negative electrode active material layer are approximately the same, and the positive electrode active material layer and the negative electrode active material layer are roughly overlapped on each other.

In the present embodiment, preferably, the positive electrode and the negative electrode are overlapped on each other so that the positive electrode active material non-applied part of the positive electrode and the negative electrode active material non-applied part of the negative electrode are positioned on opposite sides of the rectangle. The expression "the positive electrode and the negative electrode are overlapped on each other so that the positive electrode active material non-applied part of the positive electrode and the negative electrode active material non-applied part of the negative electrode are positioned on opposite sides of the rectangle" means that, for example, when the positive electrode active material non-applied part is positioned on the short side of the rectangle of the positive electrode active material layer, the negative electrode active material non-applied part is positioned on the opposite short side of the rectangle of the negative electrode active material layer. The detailed description is made below with reference to the drawing.

Note that in the present embodiment, when the positive electrode and the negative electrode are overlapped, a separator can also be disposed between the positive electrode and the negative electrode.

Figure 6A:
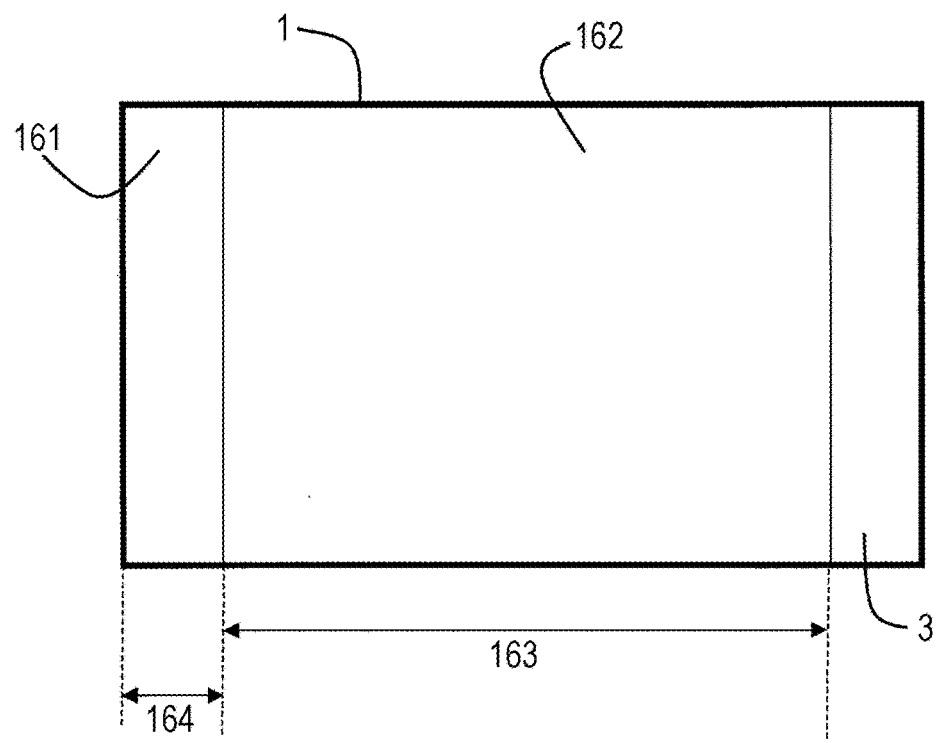
FIG. 6A is a plan view in which the lithium ion secondary battery element in FIG. 5 is viewed from an A-direction.
Figure 6B:
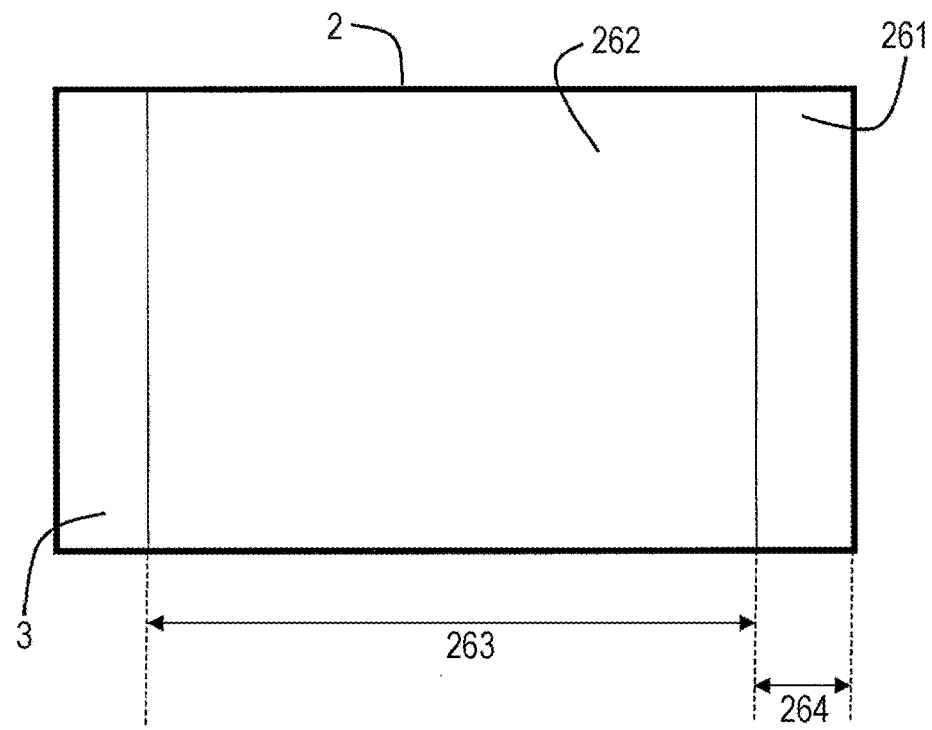
FIG. 6B is a plan view in which the lithium ion secondary battery element is viewed from a B-direction.

FIG. 5 is a cross-sectional view of the lithium ion secondary battery element according to the first embodiment in which the positive electrode and the negative electrode are overlapped on each other. In FIG. 5, the positive electrode is denoted by 1, the negative electrode is denoted by 2, the separator is denoted by 3, the positive electrode current collector is denoted by 151, the positive electrode active material layer is denoted by 152, the positive electrode active material applied part is denoted by 153, the positive electrode active material non-applied part is denoted by 154, the negative electrode current collector is denoted by 251, the negative electrode active material layer is denoted by 252, the negative electrode active material applied part is denoted by 253, and the negative electrode active material non-applied part is denoted by 254. In FIG. 5, the positive electrode 1, the separator 3, and the negative electrode 2 are illustrated in a manner that these are apart from each other. This illustration is intended to make it easier to understand the members. In the actual lithium ion secondary battery element, these members are overlapped on each other so that the members are in contact with each other. On the other hand, FIG. 6A is a plan view in which the lithium ion secondary battery element in FIG. 5 is viewed from an A-direction. FIG. 6B is a plan view in which the lithium ion secondary battery element in FIG. 5 is viewed from a B-direction. In FIG. 6A and FIG. 6B, the positive electrode is denoted by 1, the negative electrode is denoted by 2, the separator is denoted by 3, the positive electrode current collector is denoted by 161, the positive electrode active material layer is denoted by 162, the positive electrode active material applied part is denoted by 163, the positive electrode active material non-applied part is denoted by 164, the negative electrode current collector is denoted by 261, the negative electrode active material layer is denoted by 262, the negative electrode active material applied part is denoted by 263, and the negative electrode active material non-applied part is denoted by 264.

As illustrated in FIG. 6A, the positive electrode active material non-applied part 164 of the positive electrode 1 is positioned along the short side of the rectangular positive electrode current collector 161. As illustrated in FIG. 6B, the negative electrode active material non-applied part 264 of the negative electrode 2 is also positioned along the short side of the rectangular negative electrode current collector 261. The positive electrode 1 in FIG. 6A and the negative electrode 2 in FIG. 6B are overlapped on each other; thus, the battery element in FIG. 5 is formed. In FIG. 6A and FIG. 6B, the positive electrode 1 and the negative electrode 2 are overlapped on each other so that the positive electrode active material layer 162 with a generally rectangular shape in the positive electrode 1 and the negative electrode active material layer 262 with a generally rectangular shape in the negative electrode 2 are overlapped on each other substantially perfectly. That is to say, in FIG. 6A and FIG. 6B, the positive electrode 1 and the negative electrode 2 are overlapped on each other so that the short side of the positive electrode active material layer 162 and the short side of the negative electrode active material layer 262 are overlapped on each other substantially perfectly. In addition, the positive electrode active material non-applied part 164 of the positive electrode 1 and the negative electrode active material non-applied part 264 of the negative electrode 2 are overlapped on each other so as to be positioned on opposite sides of the rectangle. That is to say, the positive electrode active material non-applied part 164 positioned along the short side of the positive electrode current collector 161 in the positive electrode 1 and the negative electrode active material non-applied part 264 positioned along the short side of the negative electrode current collector 261 in the negative electrode 2 are overlapped on each other so as to be positioned on the short sides that are opposite to each other. In other words, as illustrated in FIG. 5, the positive electrode active material non-applied part 154 of the positive electrode is positioned on the left side in the drawing. On the other hand, the negative electrode active material non-applied part 254 of the negative electrode is positioned on the right side in the drawing.

In the embodiment, preferably, the border part between the negative electrode active material applied part and the negative electrode active material non-applied part is positioned closer to the peripheral side of the negative electrode current collector than the peripheral part of the positive electrode current collector that is adjacent to the negative electrode active material non-applied part. The expression "the border part between the negative electrode active material applied part and the negative electrode active material non-applied part is positioned closer to the peripheral side of the negative electrode current collector than the peripheral part of the positive electrode current collector that is adjacent to the negative electrode active material non-applied part" means that the border part between the negative electrode active material applied part and the negative electrode active material non-applied part (that is, the end of the negative electrode active material applied part) is positioned closer to the peripheral side of the negative electrode current collector (that is, outer side of the negative electrode current collector) than the peripheral part of the positive electrode current collector of the positive electrode that is adjacent to and overlapped on the negative electrode. Note that the expression "adjacent" herein refers to the overlapping of two things in a manner of being disposed next to each other, and includes the case in which they are not in contact with each other. That is to say, even the two adjacent things that have another thing interposed therebetween may be referred to as "being adjacent to each other".

Furthermore, in the embodiment, preferably, the border part between the negative electrode active material layer flat part and the negative electrode active material layer thin part is positioned closer to a central side of the negative electrode current collector than the peripheral part of the positive electrode current collector that is adjacent to the negative electrode active material non-applied part. The expression "the border part between the negative electrode active material layer flat part and the negative electrode active material layer thin part is positioned closer to a central side of the negative electrode current collector than the peripheral part of the positive electrode current collector that is adjacent to the negative electrode active material non-applied part" means that the border part between the negative electrode active material layer flat part and the negative electrode active material layer thin part (that is, the part to become the border where the thickness of the negative electrode active material layer changes) is positioned closer to the central side of the negative electrode current collector (that is, inner side of the negative electrode current collector) than the peripheral part of the positive electrode current collector of the positive electrode that is adjacent to and overlapped on the negative electrode.

In the embodiment, preferably, the density of the negative electrode active material layer thin part is the same as or smaller than that of the negative electrode active material layer flat part. That is to say, it is preferable that the density of the negative electrode active material layer thin part be the same as that of the negative electrode active material layer flat part, or if there is a difference in density between them, it is preferable that the density of the negative electrode active material layer thin part be smaller. As described above, in the electrode suggested in the typical technique (for example, WO 2015-129320 A), the outer peripheral part of the active material applied part includes the high-density part with small thickness and high density in order to suppress the formation of the locally swollen shape in the electrode due to the insulating member that adheres to an end of the electrode. In general, the structure of the lithium ion secondary battery element is designed so that the negative electrode has higher capacity than the positive electrode in order to restrain metal lithium from depositing in the negative electrode during the charging and discharging of the lithium ion secondary battery. That is to say, usually, the structure is designed so that the negative electrode active material layer has a larger area than the positive electrode active material layer. Such a structure necessarily generates a region where a starting end part of the negative electrode active material layer is adjacent to the positive electrode active material non-applied part of the positive electrode current collector. In this region, an insulating member to suppress the deposition of metal lithium is provided. In this case, the end part of the electrode has a swollen shape. In view of this, the technique according to WO 2015-129320 A is suggested in order to suppress this shape.

In WO 2015-129320 A, it is considered that a part of the negative electrode that is adjacent to and overlaps with the insulating member provided to the positive electrode is not substantially involved in the operation of the battery. Therefore, in order to prevent lithium ions from entering this part, the high-density part is provided to the outer peripheral part of the negative electrode. When this high-density part is provided, however, this part is not involved in the operation of the battery. Thus, this provision contradicts the intention of increasing the energy density of the battery by enlarging the negative electrode.

In the embodiment according to the present disclosure, as described above, the density of the negative electrode active material layer thin part is the same as or smaller than that of the negative electrode active material layer flat part. Thus, when the lithium ion secondary battery is charged, lithium ions having been transported from the positive electrode to the negative electrode reach the negative electrode and radially spread inside the negative electrode active material layer without causing the metal lithium to deposit on the surface of the negative electrode. Here, the lithium ions spread also to the negative electrode active material thin part. Accordingly, the negative electrode active material thin part is also involved in the operation of the battery substantially. It is only necessary that the area of the positive electrode active material layer provided on the positive electrode that is adjacent to the negative electrode does not exceed the area of the negative electrode active material layer, and the positive electrode active material layer does not need to be formed small more than necessary. That is to say, the area of the positive electrode active material layer can be increased within the range in which the starting end part of the positive electrode active material layer does not come closer to the peripheral side than the starting end part of the negative electrode active material layer. In this manner, in the present embodiment, the area of the positive electrode active material layer does not need to be formed small more than necessary. Accordingly, the capacity of the lithium ion secondary battery including the lithium ion secondary battery element according to the present embodiment can be increased.

Figure 7:
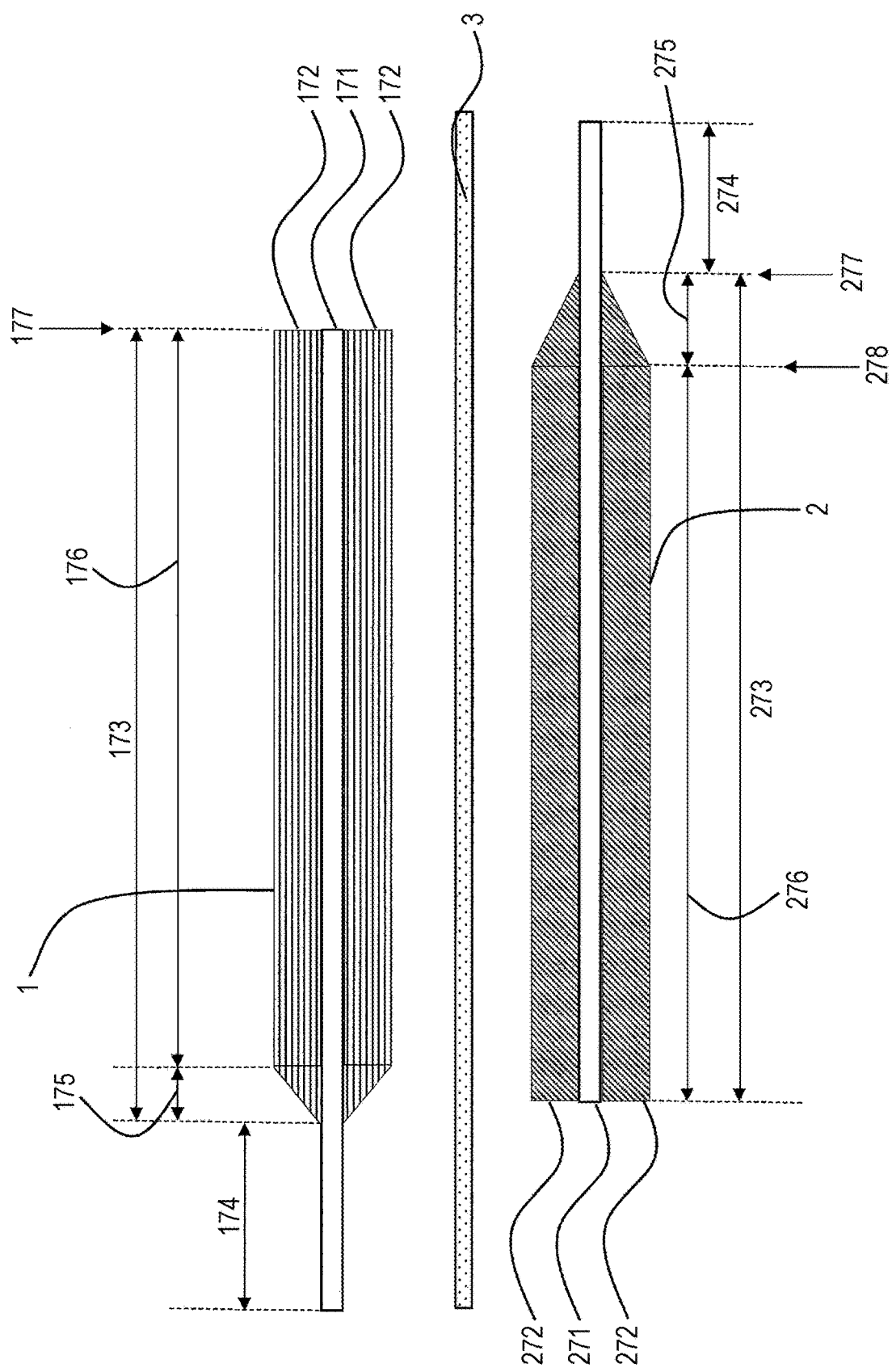
FIG. 7 is a cross-sectional view of the lithium ion secondary battery element according to the first embodiment in which the positive electrode and the negative electrode are overlapped on each other.

FIG. 7 is a cross-sectional view of the lithium ion secondary battery element according to the first embodiment in which the positive electrode and the negative electrode are overlapped on each other. In FIG. 7, the positive electrode is denoted by 1, the negative electrode is denoted by 2, the separator is denoted by 3, the positive electrode current collector is denoted by 171, the positive electrode active material layer is denoted by 172, the positive electrode active material applied part is denoted by 173, the positive electrode active material non-applied part is denoted by 174, the positive electrode active material layer thin part is denoted by 175, the positive electrode active material layer flat part is denoted by 176, the peripheral part of the positive electrode current collector is denoted by 177, the negative electrode current collector is denoted by 271, the negative electrode active material layer is denoted by 272, the negative electrode active material applied part is denoted by 273, the negative electrode active material non-applied part is denoted by 274, the negative electrode active material layer thin part is denoted by 275, the negative electrode active material layer flat part is denoted by 276, the border part between the negative electrode active material applied part and the negative electrode active material non-applied part is denoted by 277, and the border part between the negative electrode active material layer flat part and the negative electrode active material layer thin part is denoted by 278. In FIG. 7, the positive electrode 1, the separator 3, and the negative electrode 2 are illustrated in a manner that these are apart from each other. This illustration is intended to make it easier to understand the members. In the actual lithium ion secondary battery element, these members are overlapped on each other so that the members are in contact with each other.

As illustrated in FIG. 7, the border part 277 between the negative electrode active material applied part 273 and the negative electrode active material non-applied part 274 is positioned closer to the peripheral side of the negative electrode current collector 271 (right side in FIG. 7) than the peripheral part 177 of the positive electrode current collector of the positive electrode 1 that is adjacent to the negative electrode active material non-applied part 274. The border part 278 between the negative electrode active material layer flat part 276 and the negative electrode active material layer thin part 275 is positioned closer to the central side of the negative electrode current collector 271 (left side in FIG. 7) than the peripheral part 177 of the positive electrode current collector of the positive electrode 1 that is adjacent to the negative electrode active material non-applied part 274. Here, the density of the negative electrode active material layer thin part 275 is the same as or smaller than that of the negative electrode active material layer flat part 276. The negative electrode 2 as described above is overlapped on the positive electrode 1 in the aforementioned positional relation; thus, the lithium ion secondary battery element according to the first embodiment is structured.

FIG. 10 is a cross-sectional view illustrating the lithium ion secondary battery element according to the first embodiment in the case where the positive electrode and the negative electrode are overlapped on each other so as to satisfy the positional relation where the positive electrode active material non-applied part is adjacent to the negative electrode active material applied part.

In FIG. 10, the positive electrode is denoted by 1, the negative electrode is denoted by 2, the separator is denoted by 3, the positive electrode current collector is denoted by 1101, the positive electrode active material layer is denoted by 1102, the positive electrode active material applied part is denoted by 1103, the positive electrode active material non-applied part is denoted by 1104, the positive electrode active material layer thin part is denoted by 1105, the positive electrode active material layer flat part is denoted by 1106, the peripheral part of the positive electrode current collector is denoted by 1107, the insulating member is denoted by 1108, the negative electrode current collector is denoted by 2101, the negative electrode active material layer is denoted by 2102, the negative electrode active material applied part is denoted by 2103, the negative electrode active material non-applied part is denoted by 2104, the negative electrode active material layer thin part is denoted by 2105, the negative electrode active material layer flat part is denoted by 2106, the border part between the negative electrode active material applied part and the negative electrode active material non-applied part is denoted by 2107, and the border part between the negative electrode active material layer flat part and the negative electrode active material layer thin part is denoted by 2108.

In the lithium ion secondary battery element according to the first embodiment, when the positive electrode 1 and the negative electrode 2 are overlapped so as to satisfy the positional relation where the positive electrode active material non-applied part 1104 is adjacent to the negative electrode active material applied part 2103 as illustrated in FIG. 10, it is preferable to provide the insulating member 1108 so as to cover at least a part of the positive electrode active material non-applied part 1104. When the positive electrode active material non-applied part 1104 is adjacent to the negative electrode active material applied part 2103, the short-circuiting may occur in a region where these parts are adjacent. The short-circuiting may increase the heat generation in this region. In view of this, the insulating member 1108 may be provided in order to suppress the short-circuiting as much as possible, as illustrated in FIG. 10. The insulating member 1108 can be provided, for example, in a manner that an adhesive tape including a polyolefin film and an adhesive layer provided to this film is attached to, or an insulating material such as alumina is applied to at least a part of the positive electrode active material non-applied part 1104. In addition, the insulating member 1108 may be provided after the positive electrode active material layer thin part 1105 and the positive electrode active material layer flat part 1106 are formed as will be described below. Alternatively, the insulating member 1108 may be provided first at a predetermined position in the positive electrode current collector 1101, and the positive electrode active material layer thin part 1105 and the positive electrode active material layer flat part 1106 may be formed so that a part of the positive electrode active material layer thin part 1105 covers the insulating member 1108.

Another embodiment of the present disclosure is described. A lithium ion secondary battery element according to a second embodiment includes a positive electrode. The positive electrode includes a positive electrode current collector, and a positive electrode active material that is applied to at least a part of both surfaces of this positive electrode current collector so as to have substantially the same shape. Here, the positive electrode current collector includes a positive electrode active material layer with a generally rectangular shape, where the positive electrode active material is applied, and a positive electrode active material non-applied part where the positive electrode active material is not applied. The positive electrode active material non-applied part is positioned along at least a part of a peripheral part of the positive electrode current collector. Moreover, the positive electrode active material layer includes a positive electrode active material layer thin part, and a positive electrode active material layer flat part. Additionally, the positive electrode includes an insulating member that covers at least a part of the positive electrode active material non-applied part.

In the embodiment, the positive electrode is a battery member with a thin plate shape or a sheet shape. The positive electrode is formed by applying or rolling and drying the positive electrode active material layer on the positive electrode current collector such as a metal foil. That is to say, the positive electrode includes the positive electrode current collector and the positive electrode active material layer including the positive electrode active material that is applied to both surfaces of the positive electrode current collector. In the present specification, the term "positive electrode active material" may mean a mixture of the positive electrode active material that serves to conduct electricity in the battery, a binder, and a conductive agent that is used when necessary. When two surfaces of the positive electrode current collector are viewed from the respective surface sides, the positive electrode active material does not need to be applied to the entire surface of the positive electrode current collector and it is only necessary that the positive electrode active material is applied to at least a part thereof. It is preferable that the positive electrode current collector include the positive electrode active material layer with a generally rectangular shape, where the positive electrode active material is applied, and the positive electrode active material non-applied part where the positive electrode active material is not applied.

In the embodiment, the expression "the positive electrode active material is applied so as to have substantially the same shape" means both "when two surfaces of the positive electrode current collector are viewed from the respective surface sides, the positive electrode active materials are disposed to have substantially the same shape" and "when the cross section of the positive electrode is viewed, the positive electrode active materials are disposed to have the substantially symmetric shape along the positive electrode current collector".

The positive electrode active material layer may include a positive electrode active material layer thin part in which the positive electrode active material is thin, and a positive electrode active material layer flat part in which the positive electrode active material is applied with substantially uniform thickness. The positive electrode active material layer thin part and the positive electrode active material layer flat part may be positioned at any place in the positive electrode active material layer. For example, the positive electrode active material layer thin part can be positioned at a peripheral part of the positive electrode active material layer. The positive electrode active material layer may become thinner gradually toward a border part between the positive electrode active material applied part and the positive electrode active material non-applied part. That is to say, the positive electrode active material layer thin part may be formed in a manner that the positive electrode active material layer becomes thinner gradually toward the border part between the positive electrode active material applied part and the positive electrode active material non-applied part. In addition, the shape of the positive electrode active material layer is generally rectangular. Here, the term "generally rectangular" means that when two surfaces of the positive electrode current collector are viewed from the respective surface sides, the shape of the positive electrode active material layer is a tetragon (for example, rectangular, square, rhomboid, or parallelogram).

In the embodiment, the insulating member can be disposed so as to cover at least a part of the positive electrode active material non-applied part. When the positive electrode active material non-applied part is adjacent to the negative electrode active material applied part, the short-circuiting may occur in a region where these parts are adjacent. The short-circuiting may increase the heat generation in this region. In view of this, the insulating member may be provided in order to suppress the short-circuiting as much as possible. One example of the insulating member is an adhesive tape including a polyolefin film and an adhesive layer provided to this film.

The lithium ion secondary battery element according to the embodiment includes a negative electrode. The negative electrode includes a negative electrode current collector, and a negative electrode active material that is applied to at least a part of both surfaces of this negative electrode current collector so as to have substantially the same shape. Here, the negative electrode current collector includes a negative electrode active material applied part with a generally rectangular shape, where the negative electrode active material is applied and whose shape is substantially the same as that of the aforementioned positive electrode active material layer, and a negative electrode active material non-applied part where the negative electrode active material is not applied. The negative electrode active material non-applied part is positioned along at least a part of a peripheral part of the negative electrode current collector. Moreover, the negative electrode active material layer includes a negative electrode active material layer thin part, and a negative electrode active material layer flat part.

In the embodiment, the negative electrode is a battery member with a thin plate shape or a sheet shape. The negative electrode is formed by applying or rolling and drying the negative electrode active material layer on the negative electrode current collector such as a metal foil. That is to say, the negative electrode includes the negative electrode current collector and the negative electrode active material layer including the negative electrode active material that is applied to both surfaces of the negative electrode current collector. In the present specification, the term "negative electrode active material" may mean a mixture of the negative electrode active material that serves to conduct electricity in the battery, a binder, and a conductive agent that is used when necessary. When two surfaces of the negative electrode current collector are viewed from the respective surface sides, the negative electrode active material does not need to be applied to the entire surface of the negative electrode current collector and it is only necessary that the negative electrode active material is applied to at least a part thereof. Preferably, the negative electrode current collector includes the negative electrode active material layer with a generally rectangular shape, where the negative electrode active material is applied, and the negative electrode active material non-applied part where the negative electrode active material is not applied.

In the embodiment, the expression "the negative electrode active material is applied so as to have substantially the same shape" means both "when two surfaces of the negative electrode current collector are viewed from the respective surface sides, the negative electrode active materials are disposed to have substantially the same shape" and "when the cross section of the negative electrode is viewed, the negative electrode active materials are disposed to have the substantially symmetric shape along the negative electrode current collector".

The negative electrode active material layer may include a negative electrode active material layer thin part in which the negative electrode active material is thin, and a negative electrode active material layer flat part in which the negative electrode active material is applied with substantially uniform thickness. The negative electrode active material layer thin part and the negative electrode active material layer flat part may be positioned at any place in the negative electrode active material layer. For example, the negative electrode active material layer thin part can be positioned at a peripheral part of the negative electrode active material layer. The negative electrode active material layer may become thinner gradually toward a border part between the negative electrode active material applied part and the negative electrode active material non-applied part. That is to say, the negative electrode active material layer thin part may be formed in a manner that the negative electrode active material layer becomes thinner gradually toward the border part between the negative electrode active material applied part and the negative electrode active material non-applied part. In addition, the shape of the negative electrode active material layer is generally rectangular. Here, the term "generally rectangular" means that when two surfaces of the negative electrode current collector are viewed from the respective surface sides, the shape of the negative electrode active material layer is a tetragon (for example, rectangular, square, rhomboid, or parallelogram).

In the lithium ion secondary battery element according to the embodiment, the positive electrode and the negative electrode are overlapped on each other so that the positive electrode active material layer with a generally rectangular shape in the positive electrode and the negative electrode active material layer with a generally rectangular shape in the negative electrode are overlapped on each other substantially perfectly. The expression "the positive electrode and the negative electrode are overlapped on each other so that the positive electrode active material layer with a generally rectangular shape in the positive electrode and the negative electrode active material layer with a generally rectangular shape in the negative electrode are overlapped on each other substantially perfectly" means that the positive electrode and the negative electrode are overlapped on each other so that each side of the positive electrode active material layer with a generally rectangular shape and each side of the negative electrode active material layer with a generally rectangular shape are overlapped on each other substantially perfectly. For example, when the shape of the positive electrode active material layer is a rectangle, the shape of the negative electrode active material layer is also a rectangle that is substantially the same. The positive electrode and the negative electrode can be overlapped on each other so that the long side of the rectangle of the positive electrode active material layer and the long side of the negative electrode active material layer are overlapped on each other substantially perfectly. Here, the shape of the positive electrode active material layer and the shape of the negative electrode active material layer do not have to be exactly the same. Moreover, the positive electrode and the negative electrode do not have to be overlapped on each other so that the positive electrode active material layer and the negative electrode active material layer are overlapped perfectly. It is only necessary that the rectangle of the positive electrode active material layer and the rectangle of the negative electrode active material layer are approximately the same, and the positive electrode active material layer and the negative electrode active material layer are roughly overlapped on each other.

In the present embodiment, preferably, the positive electrode and the negative electrode are overlapped on each other so that the positive electrode active material non-applied part of the positive electrode and the negative electrode active material non-applied part of the negative electrode are positioned on the same side of the rectangle. The expression "the positive electrode and the negative electrode are overlapped on each other so that the positive electrode active material non-applied part of the positive electrode and the negative electrode active material non-applied part of the negative electrode are positioned on the same side of the rectangle" means that, for example, when the positive electrode active material non-applied part is positioned on the short side of the rectangle of the positive electrode active material layer, the negative electrode active material non-applied part is positioned on the same short side of the rectangle of the negative electrode active material layer. The detailed description is made below with reference to the drawing.

Note that in the present embodiment, when the positive electrode and the negative electrode are overlapped, a separator can also be disposed between the positive electrode and the negative electrode.

In the embodiment, preferably, the border part between the negative electrode active material applied part and the negative electrode active material non-applied part is positioned adjacent to the insulating member. The expression "the border part between the negative electrode active material applied part and the negative electrode active material non-applied part is positioned adjacent to the insulating member" means that the border part between the negative electrode active material applied part and the negative electrode active material non-applied part (that is, the end of the negative electrode active material applied part) is disposed so as to overlap with the insulating member that covers at least a part of the positive electrode active material non-applied part of the positive electrode that is adjacent to the border part.

In the embodiment, preferably, the border part between the negative electrode active material layer thin part and the negative electrode active material layer flat part is positioned adjacent to the positive electrode active material layer flat part. The expression "the border part between the negative electrode active material layer thin part and the negative electrode active material layer flat part is positioned adjacent to the positive electrode active material layer flat part" means that the border part between the negative electrode active material layer thin part and the negative electrode active material layer flat part (that is, the part that becomes the border where the thickness of the negative electrode active material layer changes) is disposed so as to overlap with the positive electrode active material layer flat part of the positive electrode active material layer in the positive electrode.

In addition, in the embodiment, preferably, the density of the negative electrode active material layer thin part is the same as or smaller than that of the negative electrode active material layer flat part. That is to say, it is preferable that the density of the negative electrode active material layer thin part be the same as that of the negative electrode active material layer flat part, or if there is a difference in density between them, it is preferable that the density of the negative electrode active material layer thin part be smaller.

In the second embodiment, the positive electrode 1 with the shape illustrated in FIG. 1 and FIG. 2 can be used, and the negative electrode 2 with the shape illustrated in FIG. 3 and FIG. 4 can be used.

Figure 8:
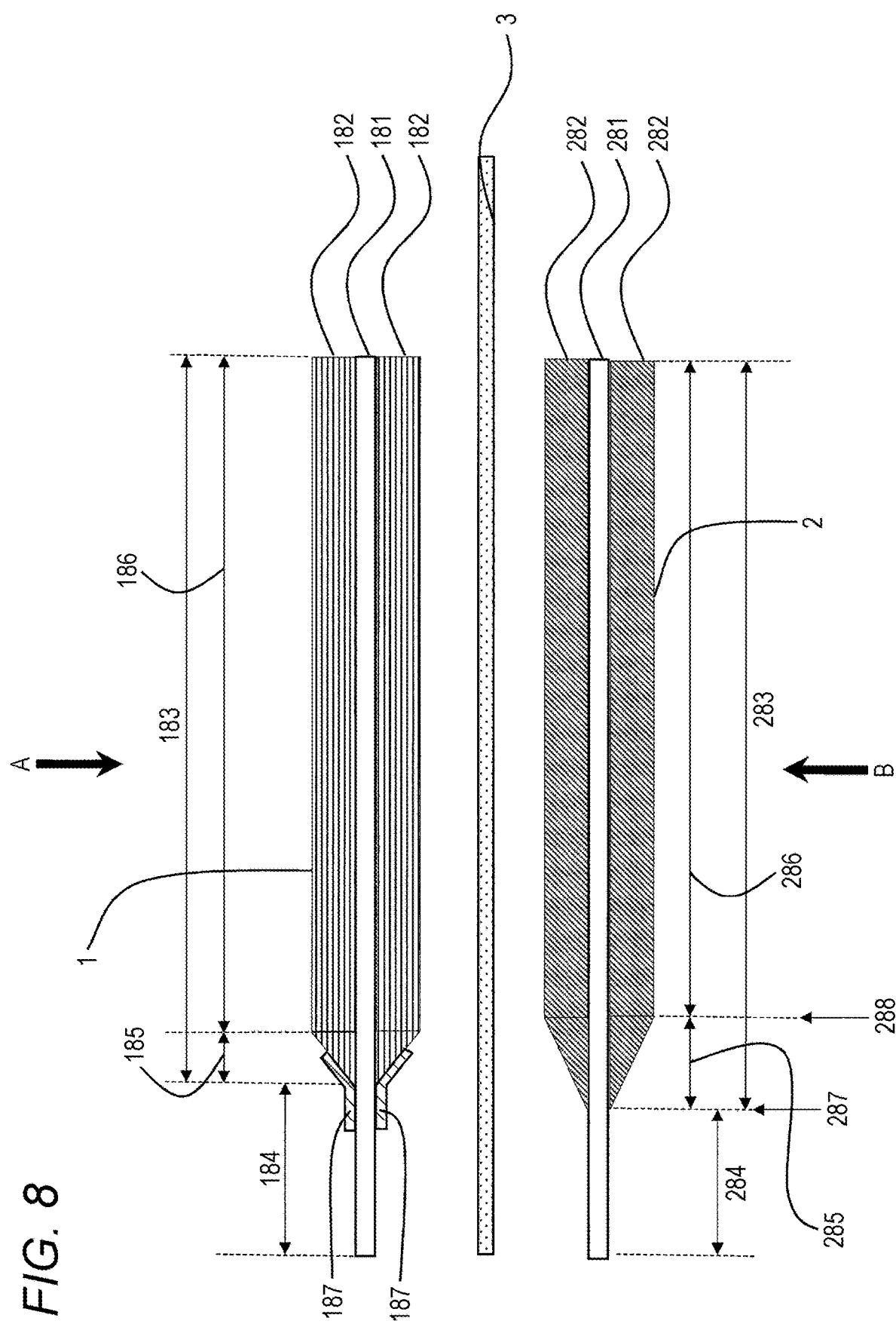
FIG. 8 is a cross-sectional view of a lithium ion secondary battery element according to a second embodiment in which the positive electrode and the negative electrode are overlapped on each other.
Figure 9A:
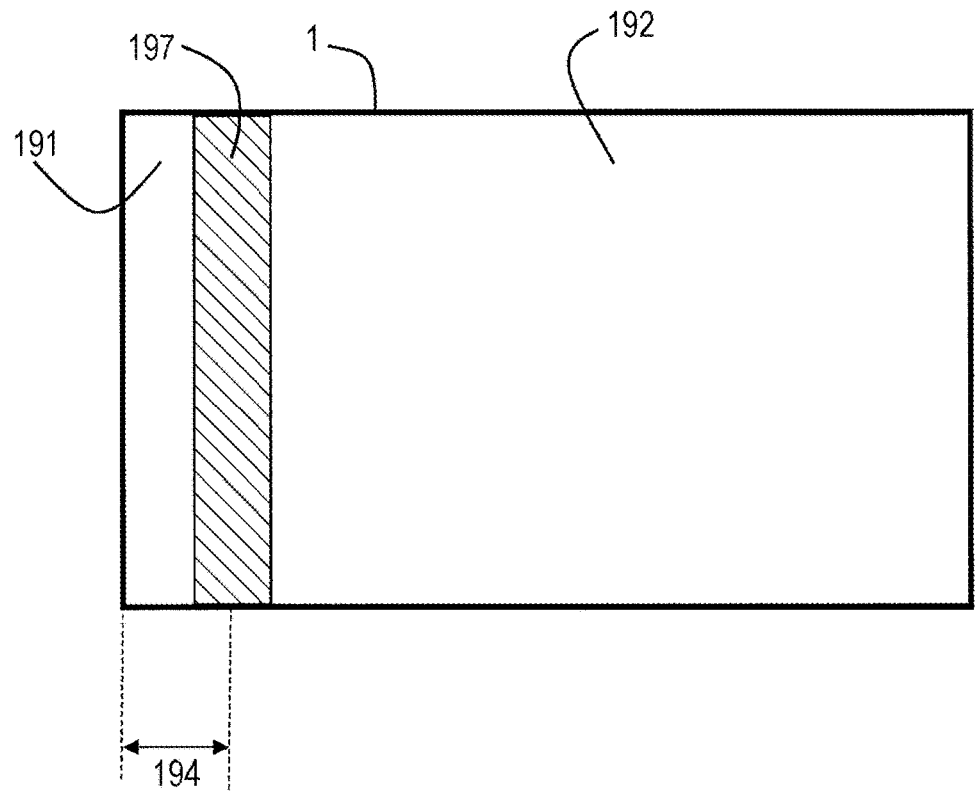
FIG. 9A is a plan view in which the lithium ion secondary battery element in FIG. 8 is viewed from the A-direction.
Figure 9B:
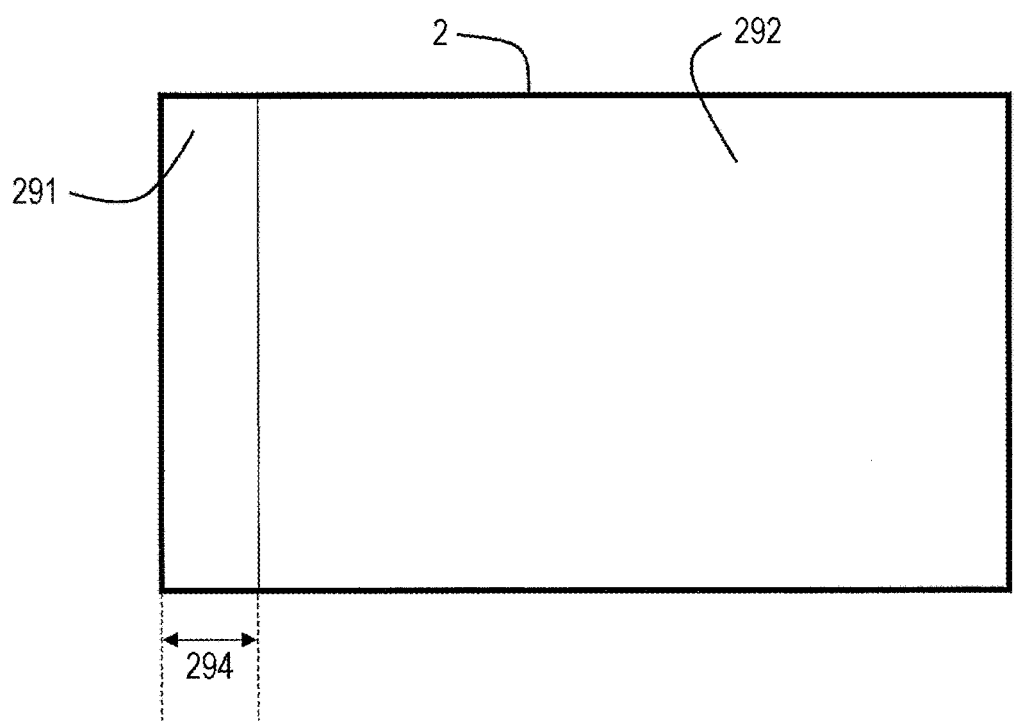
FIG. 9B is a plan view in which the lithium ion secondary battery element is viewed from the B-direction.

FIG. 8 is a cross-sectional view of the lithium ion secondary battery element according to the second embodiment in which the positive electrode and the negative electrode are overlapped on each other. In FIG. 8, the positive electrode is denoted by 1, the negative electrode is denoted by 2, the separator is denoted by 3, the positive electrode current collector is denoted by 181, the positive electrode active material layer is denoted by 182, the positive electrode active material applied part is denoted by 183, the positive electrode active material non-applied part is denoted by 184, the positive electrode active material layer thin part is denoted by 185, the positive electrode active material layer flat part is denoted by 186, the insulating member is denoted by 187, the negative electrode current collector is denoted by 281, the negative electrode active material layer is denoted by 282, the negative electrode active material applied part is denoted by 283, the negative electrode active material non-applied part is denoted by 284, the negative electrode active material layer thin part is denoted by 285, and the negative electrode active material layer flat part is denoted by 286. In FIG. 8, the positive electrode 1, the separator 3, and the negative electrode 2 are illustrated in a manner that these are apart from each other. This illustration is intended to make it easier to understand the members. In the actual lithium ion secondary battery element, these members are overlapped on each other so that the members are in contact with each other. On the other hand, FIG. 9A is a plan view in which the lithium ion secondary battery element in FIG. 8 is viewed from the A-direction. FIG. 9B is a plan view in which this lithium ion secondary battery element is viewed from the B-direction. In FIG. 9A and FIG. 9B, the positive electrode is denoted by 1, the negative electrode is denoted by 2, the positive electrode current collector is denoted by 191, the positive electrode active material layer is denoted by 192, the positive electrode active material non-applied part is denoted by 194, the insulating member is denoted by 197, the negative electrode current collector is denoted by 291, the negative electrode active material layer is denoted by 292, and the negative electrode active material non-applied part is denoted by 294.

First, as illustrated in FIG. 9A, the positive electrode active material non-applied part 194 of the positive electrode 1 is positioned along the short side of the rectangular positive electrode current collector 191. Moreover, as illustrated in FIG. 9B, the negative electrode active material non-applied part 294 of the negative electrode 2 is also positioned along the short side of the rectangular negative electrode current collector 291. Then, the positive electrode 1 and the negative electrode 2 are overlapped on each other so that the positive electrode active material non-applied part 194 of the positive electrode 1 and the negative electrode active material non-applied part 294 of the negative electrode 2 are positioned along the same side of the rectangle (on the left side in FIG. 9A).

In FIG. 8, as described above, the positive electrode active material non-applied part 184 of the positive electrode is positioned on the left side in FIG. 8. The negative electrode active material non-applied part 284 of the negative electrode is also positioned on the left side in FIG. 8. A border part 287 between the negative electrode active material applied part 283 and the negative electrode active material non-applied part 284 (that is, end of the negative electrode active material applied part 283) is positioned adjacent to the insulating member 187. In addition, a border part 288 between the negative electrode active material layer thin part 285 and the negative electrode active material layer flat part 286 (that is, border where the thickness of the negative electrode active material layer 282 changes) is positioned adjacent to the positive electrode active material layer flat part 183. Here, the density of the negative electrode active material layer thin part 285 is the same as or smaller than that of the negative electrode active material layer flat part 286. The negative electrode 2 as described above is overlapped on the positive electrode 1 in the aforementioned positional relation; thus, the lithium ion secondary battery element according to the second embodiment is structured.

By using the lithium ion secondary battery element according to each of the above embodiments, the lithium ion secondary battery can be obtained. Another embodiment of the present disclosure is a lithium ion secondary battery including a package, and a power generating element including any of the lithium ion secondary battery elements according to the aforementioned embodiments and an electrolyte solution in this package.

Here, the lithium ion secondary battery elements according to all the embodiments and the members that form the lithium ion secondary batteries are described in detail. The positive electrode that can be used in all the embodiments is the positive electrode where the positive electrode active material is applied. The positive electrode includes the positive electrode active material layer. The positive electrode active material layer is obtained by applying or rolling and drying the positive electrode active material mixture that includes the positive electrode active material, the binder, and in some cases, the conductive agent, on the positive electrode current collector formed of a metal foil such as an aluminum foil. The positive electrode active material layer preferably has a porous or microporous shape including pores. In each embodiment, the positive electrode active material layer preferably includes lithium-nickel composite oxide as the positive electrode active material. The lithium-nickel composite oxide means transition metal composite oxide containing lithium and nickel that is expressed by general formula $Li_xNi_yMe_{(1-y)}O_2$ (in which Me represents at least one metal selected from the group consisting of Al, Mn, Na, Fe, Co, Cr, Cu, Zn, Ca, K, Mg, and Pb).

The positive electrode active material layer can include the lithium-manganese composite oxide as the positive electrode active material. Examples of the lithium-manganese composite oxide include lithium manganese oxide ($LiMnO_2$) with a zig-zag layer structure and spinel type lithium manganese oxide ($LiMn_2O_4$). By using the lithium-manganese composite oxide in combination, the positive electrode can be manufactured at lower cost. In particular, it is preferable to use spinel type lithium manganese oxide ($LiMn_2O_4$) because this is excellent in stability of the crystal structure in an over-charged state. In a case where the lithium-manganese positive electrode active material is included as the positive electrode active material, the lithium-manganese positive electrode active material is contained by preferably 70 wt % or less, more preferably 30 wt % or less, per the weight of the positive electrode active material. In the case of using the mixed positive electrode, containing too much lithium-manganese composite oxide in the positive electrode active material results in the easy formation of the partial battery between the mixed positive electrode and the deposited substance derived from the metal foreign substance that may mix in the battery. Thus, the short-circuiting current easily flows.

Particularly preferably, the positive electrode active material layer includes, as the positive electrode active material, lithium-nickel-manganese-cobalt composite oxide with a layered crystal structure expressed by a general formula $L_xNi_yCo_zMn_{(1-y-z)}O_2$. In this general formula, x satisfies $1 \leq x \leq 1.2$, y and z are positive numerals that satisfy y+z<1. In addition, y is 0.5 or more. As the ratio of manganese becomes higher, it becomes difficult to synthesize the composite oxide with a single phase. Therefore, it is desirable that $1-y-z \leq 0.4$. In order to obtain the battery with high capacity, it is particularly preferable to satisfy $y > 1-y-z$ and $y > z$. The lithium-nickel composite oxide with this general formula is lithium-nickel-cobalt-manganese composite oxide (hereinafter also referred to as "NCM"). NCM is the lithium-nickel composite oxide that is suitably used to increase the capacity of the battery. For example, in the general formula $Li_xNi_yCo_zMn_{(1.0-y-z)}O_2$, the composite oxide with x=1, y=0.8, and z=0.1 is referred to as "NCM811" and the composite oxide with x=1, y=0.5, and z=0.2 is referred to as "NCM523".

Examples of the binder used for the positive electrode active material layer include fluorine resin such as polyvinylidene fluoride (PVDF), polytetrafluoroethylene (PTFE), and polyvinyl fluoride (PVF), conductive polymers such as polyanilines, polythiophenes, polyacetylenes, and polypyrroles, synthetic rubber such as styrene butadiene rubber (SBR), butadiene rubber (BR), chloroprene rubber (CR), isoprene rubber (IR), and acrylonitrile butadiene rubber (NBR), and polysaccharides such as carboxymethyl cellulose (CMC), xanthan gum, guar gum, and pectin.

Examples of the conductive agent that may be used for the positive electrode active material layer include carbon fiber such as carbon nanofiber, carbon black such as acetylene black and Ketjen black, and other carbon materials such as activated carbon, graphite, mesoporous carbon, fullerenes, and carbon nanotube. In addition, electrode additives that are generally used to form the electrode, such as thickener, dispersant, and stabilizer, can be used for the positive electrode active material layer as appropriate.

Preferably, the non-applied part where the positive electrode active material is not applied as described above is provided in the positive electrode active material layer. The positive electrode active material non-applied part on the positive electrode current collector is provided to connect a positive electrode lead in particular. The positive electrode active material layer may be provided with uniform thickness. The thickness of the positive electrode active material layer can be changed in accordance with the part where the active material is applied. Preferably, the positive electrode active material layer includes the positive electrode active material layer flat part and the positive electrode active material layer thin part that corresponds to the part where the positive electrode active material layer becomes thinner toward the border part between the positive electrode active material applied part and the positive electrode active material non-applied part. In some cases, the insulating material may be provided to cover at least a part of the thus provided positive electrode active material layer thin part and at least a part of the thus provided positive electrode active material non-applied part. In a case where the lithium ion secondary battery element has a structure in which the positive electrode active material non-applied part is adjacent to the negative electrode active material applied part (for example, in the case of the lithium ion secondary battery element according to the second embodiment described above), the short-circuiting may occur in a region where these parts are adjacent to each other. The short-circuiting may increase the heat generation in this region. In view of this, the insulating member may be provided in order to suppress the short-circuiting as much as possible. As the insulating member, an adhesive tape including a polyolefin film and an adhesive layer provided to this film may be used.

The negative electrode that can be used in all the embodiments is the negative electrode where a negative electrode active material mixture is applied. The negative electrode includes the negative electrode active material layer. The negative electrode active material layer is obtained by applying or rolling and drying the negative electrode active material mixture that includes the negative electrode active material, the binder, and in some cases, the conductive agent, on the negative electrode current collector formed of a metal foil such as a copper foil. Preferably, the negative electrode active material layer has a porous shape or a microporous shape including pores. In each embodiment, the negative electrode active material contains graphite. In particular, the negative electrode active material layer containing graphite is advantageous in that the output of the battery can be increased even when the residual capacity of the battery (SOC) is low. Graphite is a hexagonal crystal carbon material with a hexagonal plate shape, and is also referred to as black lead or graphite. Graphite is preferably in a particulate form.

Graphite includes natural graphite and synthetic graphite. Natural graphite is inexpensive and commercially available in large quantity, and has a stable structure and excellent durability. Synthetic graphite is graphite that is produced artificially. Synthetic graphite has high purity (hardly contains impurities such as allotrope) and therefore has low electric resistance. As the carbon material in the embodiments, natural graphite and synthetic graphite can be suitably used. As the carbon material in the embodiments, natural graphite coated with amorphous carbon and synthetic graphite coated with amorphous carbon can be used.

Amorphous carbon is a carbon material that has a structure in which microcrystals are randomly networked and is amorphous as a whole. The amorphous carbon may partially include a structure similar to that of graphite. Examples of the amorphous carbon include carbon black, cokes, activated carbon, carbon fiber, hard carbon, soft carbon, and mesoporous carbon.

These negative electrode active materials may be used in mixture. In addition, graphite coated with amorphous carbon may be used. When a mixed carbon material containing both graphite particles and amorphous carbon particles is used as the negative electrode active material, the regeneration performance of the battery is improved. When natural graphite particles coated with amorphous carbon or synthetic graphite coated with amorphous carbon is used as the carbon material of the negative electrode active material, the decomposition of the electrolyte solution is suppressed; therefore, the durability of the negative electrode is improved.

When the synthetic graphite is used, the synthetic graphite preferably has an interlayer distance d ($d_{002}$) of 0.337 nm or more. The crystal structure of the synthetic graphite is usually thinner than that of the natural graphite. In the case where the synthetic graphite is used as the negative electrode active material for the lithium ion secondary battery, the synthetic graphite preferably has the interlayer distance enough to intercalate lithium ions. The interlayer distance enough to intercalate lithium ions is estimated based on the d value ($d_{002}$). When the d value is 0.337 nm or more, intercalation and deintercalation of lithium ions are performed without problems.

The negative electrode active material is not limited to a particular material, and may be any material that can intercalate and deintercalate lithium ions, and known negative electrode active materials can be used. Specific examples of the negative electrode active material include the aforementioned carbon materials including graphite (natural graphite, synthetic graphite, or the like), cokes, and hard carbon, and moreover lithium alloy such as lithium-aluminum alloy, lithium-lead alloy, and lithium-tin alloy, lithium metal, Si, and metal oxide with a smaller potential than the positive electrode active material, for example $SnO_2$, SnO, $TiO_2$, SiO, and $Li_4Ti_5O_{12}$. One kind, or two or more kinds of these elements can be used in mixture.

Among these elements, by using the negative electrode active material containing Li metal, metal that can form alloy with lithium, such as Si, Sn, or Al, or metal oxide that can intercalate and deintercalate lithium ions in combination with the positive electrode according to any of the above embodiments, the effect of improving the energy density can be obtained further. Examples of the metal oxide that can intercalate and deintercalate lithium ions include Si oxide (SiOx ($0<x\leq2$)), Si composite oxide containing Si and metal elements other than Si (for example, Li, B, Mg, Na, Al, K, Ca, Ti, V, Cr, Mn, Fe, Co, Ni, Cu, or Zn), Sn oxide, and Sn composite oxide containing Sn and metal elements other than Sn. These negative electrode active materials may forma complex with the carbon material. These negative electrode active materials may be coated with the carbon material. The content of these negative electrode active materials is not limited to a particular value. However, from the viewpoint of increasing the energy density, the content of these negative electrode active materials is usually 5 wt % or more, preferably 10 wt % or more, more preferably 20 wt % or more, and much more preferably 40 wt % or more in the negative electrode active material.

Examples of the binder used for the negative electrode active material layer include fluorine resin such as polyvinylidene fluoride (PVDF), polytetrafluoroethylene (PTFE), and polyvinyl fluoride (PVF), conductive polymers such as polyanilines, polythiophenes, polyacetylenes, and polypyrroles, synthetic rubber such as styrene butadiene rubber (SBR), butadiene rubber (BR), chloroprene rubber (CR), isoprene rubber (IR), and acrylonitrile butadiene rubber (NBR), and polysaccharides such as carboxymethyl cellulose (CMC), xanthan gum, guar gum, and pectin.

Examples of the conductive agent that may be used for the negative electrode active material layer include carbon fiber such as carbon nanofiber, carbon black such as acetylene black and Ketjen black, and other carbon materials such as activated carbon, mesoporous carbon, fullerenes, and carbon nanotube. In addition, electrode additives that are generally used to form the electrode, such as thickener, dispersant, and stabilizer, can be used for the negative electrode active material layer as appropriate.

As described above, the non-applied part where the negative electrode active material is not applied is preferably provided to the negative electrode active material layer. The negative electrode active material non-applied part on the negative electrode current collector is provided particularly to connect a negative electrode lead. The thickness of the negative electrode active material layer can be changed in accordance with the part where the negative electrode active material is applied. The negative electrode active material layer may include the negative electrode active material layer flat part and the negative electrode active material layer thin part that corresponds to the part where the negative electrode active material layer becomes thinner toward the border part between the negative electrode active material applied part and the negative electrode active material non-applied part.

Each of the positive electrode and the negative electrode that can be used in all the embodiments includes the electrode current collector and the electrode active material layer containing the aforementioned positive electrode active material or the aforementioned negative electrode active material that is disposed on the electrode current collector. The thickness of the flat part of each electrode active material layer is preferably 10 to 100 µm, more preferably 50 to 80 µm per one surface. When the thickness of the flat part of each electrode active material layer is too small, it may be difficult to form the uniform electrode active material layer. On the other hand, when the thickness of the flat part of each electrode active material layer is too large, the charge-discharge performance at high rate may deteriorate. Note that the thickness of the negative electrode active material layer is preferably larger than that of the positive electrode active material layer that is adjacent through the separator on the entire surface of the negative electrode active material layer.

In the lithium ion secondary battery elements in all the embodiments, the separator can be used in some cases. One example of the separator is a polyolefin film. Polyolefin is a compound that can be obtained by polymerizing or co-polymerizing a-olefin such as ethylene, propylene, butene, pentene, and hexene. Examples of the polyolefin include polyethylene, polypropylene, polybutene, polypentene, polyhexene, and a copolymer of these. In the case of using the polyolefin film as the separator, it is advantageous that the polyolefin film is the polyolefin film with a structure including pores that are closed when the battery temperature becomes high, that is, the porous or microporous polyolefin film. When the polyolefin film has such a structure, if the battery temperature should increase, the separator is closed (shut down) to be able to block the ion flow. That is to say, a uniaxially oriented polyolefin film is shrunk when the battery is heated, so that the pores are closed. Therefore, the short-circuiting between the positive and negative electrodes can be suppressed in the uniaxially oriented polyolefin film. In order to obtain the shutdown effect, it is particularly preferable to use the porous polyethylene film as the separator.

In addition, a crosslinked film can be used as the separator. The porous or microporous polyolefin film has a property of shrinking when heated, and therefore, when the battery is overheated, the film is shrunk and shut down. However, when the heat shrinkage of the film is too high, the film area changes largely. This may result in the generation of large current. The crosslinked polyolefin film has a proper heat shrinkage, and therefore, when overheated, the film does not largely change in area, and shrinks only to close the pores.

The separator that is used in all the embodiments may include a heat-resistance microparticle layer on one surface or both surfaces of the separator. In this case, the heat-resistance microparticle layer that is provided to suppress the overheat of the battery has a heat-resistance temperature of 150° C. or more and includes inorganic microparticles that are stable in electrochemical reaction. Examples of the inorganic microparticle include inorganic oxide such as silica, alumina (α-alumina, β-alumina, θ-alumina), iron oxide, titanium oxide, barium titanate, and zirconium oxide, and minerals such as boehmite, zeolite, apatite, kaolin, spinel, mica, and mullite.

The positive electrode, the separator, and the negative electrode have an independent sheet shape. In the case of overlapping the separator, the separator is disposed between the positive electrode and the negative electrode; thus, the lithium ion secondary battery element can be formed.

The lithium ion secondary battery element is impregnated with the electrolyte solution and then held in a sealed package; thus, the lithium ion battery can be formed. Sealing means covering the lithium ion secondary battery element with a relatively soft package material so that at least a part of the lithium ion secondary battery element is not exposed to the external air. The package of the lithium ion secondary battery has a gas barrier property, and is a housing that can be sealed to hold the lithium ion secondary battery element or has a bag-like shape formed of a soft material. A suitable example of the package to be used is an aluminum can or an aluminum laminate sheet that is a stack of an aluminum foil and polypropylene. The lithium ion secondary battery may be in various modes, such as a coin battery, a laminate battery, or a wound battery.

The electrolyte solution is the solution with electric conductivity in which the ionic substance is dissolved in solvent. As the electrolyte solution, a nonaqueous electrolyte solution can be particularly used in all the embodiments. The lithium ion secondary battery element including the electrolyte solution and the stack formed by overlapping the positive electrode and the negative electrode and in some cases, including the separator constitutes one unit of the main components of the battery. In general, the stack formed by overlapping the positive electrodes and the negative electrodes with the separators interposed therebetween is impregnated with the electrolyte solution. The electrolyte solution that can be used in all the embodiments in this specification is preferably a nonaqueous electrolyte solution. This electrolyte solution is preferably a mixture of linear carbonate and cyclic carbonate. Examples of the linear carbonate include dimethyl carbonate (DMC), diethyl carbonate (DEC), ethyl methyl carbonate (EMC), di-n-propyl carbonate, di-t-propyl carbonate, di-n-butyl carbonate, di-isobutyl carbonate and di-t-butyl carbonate. Examples of the cyclic carbonate include propylene carbonate (PC) and ethylene carbonate (EC). The electrolyte solution is formed by dissolving lithium salt such as lithium hexafluoride phosphate ($LiPF_6$), lithium tetrafluoroborate ($LiBF_4$), and lithium perchlorate ($LiClO_4$) in such a carbonate mixture.

The electrolyte solution may additionally include a cyclic carbonate compound that is different from the aforementioned cyclic carbonate as the additive. Examples of the cyclic carbonate that is used as the additive include vinylene carbonate (VC). Another example of the additive is a cyclic carbonate compound with a halogen. These cyclic carbonates are also the compounds that form a protective film for the positive electrode and the negative electrode in a process for charging and discharging the battery. The additive is particularly preferably the compound that can restrain a sulfur-contained compound such as the aforementioned disulfonic acid compound or disulfonic acid ester compound from attaching the positive electrode active material containing the lithium-nickel composite oxide. Examples of the cyclic carbonate compound with a halogen include fluoroethylene carbonate (FEC), difluoroethylene carbonate, trifluoroethylene carbonate, chloroethylene carbonate, dichloroethylene carbonate, and trichloroethylene carbonate. Fluoroethylene carbonate that is the cyclic carbonate compound with a halogen and an unsaturated bond is particularly preferable for use.

The electrolyte solution may additionally contain a disulfonic acid compound as the additive. The disulfonic acid compound is a compound including two sulfo groups in one molecule. The disulfonic acid compound includes a disulfonic acid salt compound in which a sulfo group forms a salt with metal ion, or a disulfonic acid ester compound in which a sulfo group forms an ester. One or two sulfo groups in the disulfonic acid compound may form a salt with the metal ion or may be in an anionic state. Examples of the disulfonic acid compound include methane disulfonic acid, 1,2-ethane disulfonic acid, 1,3-propane disulfonic acid, 1,4-butane disulfonic acid, benzene disulfonic acid, naphthalene disulfonic acid, biphenyl disulfonic acid, and salts thereof (such as methane disulfonic acid lithium and 1,2-ethane disulfonic acid lithium), and anions thereof (such as methane disulfonic acid anion and 1,2-ethane disulfonic acid anion). In addition, a disulfonic acid ester compound is given as the disulfonic acid compound. Other preferable examples of the disulfonic acid compound to be used include linear disulfonic acid ester, for example alkyl diester and aryl diester, such as methane disulfonic acid, 1,2-ethane disulfonic acid, 1,3-propane disulfonic acid, 1,4-butane disulfonic acid, benzene disulfonic acid, naphthalene disulfonic acid, and biphenyl disulfonic acid, and cyclic disulfonic acid ester such as methylene methane disulfonic acid ester, ethylene methane disulfonic acid ester, and propylene methane disulfonic acid ester. Methylene methane disulfonic acid ester (MMDS) is particularly preferably used.

The lithium ion secondary battery can be formed by forming a stack in a manner of overlapping the positive electrode and the negative electrode described above with the separator interposed therebetween, and by sealing this stack in the package together with the electrolyte solution. The material of the package may be any material that does not easily allow the electrolyte solution to leak out. The material of the package may be a laminate film whose outermost layer is a heat-resistant protective layer of polyester, polyamide, or liquid crystal polymer and whose innermost layer is a sealant layer formed of a thermoplastic resin. Examples of the thermoplastic resin that forms the sealant layer as the innermost layer include polyethylene, polypropylene, ionomer, and acid-modified polyethylene such as maleic acid modified polyethylene, acid-modified polypropylene such as maleic acid modified polypropylene, polyethylene terephthalate (PET), polyethylene naphthalate (PEN), polyethylene isophthalate (PEI), a blend of PET and PEN, a blend of PET and PEI, polyamide resin, a blend of polyamide resin and PET, and a blend of polyamide containing a xylylene group and PET. The package may be formed by further increasing the number of layers by welding or fusing one or more laminate films in combination. As the metal layer with a gas barrier property, aluminum, tin, copper, nickel, and stainless steel can be used. The thickness of the metal layer is preferably 30 to 50 μm. The material of the package is particularly preferably an aluminum laminate corresponding to a stack of an aluminum foil and polymer such as polyethylene and polypropylene.

Next, a manufacturing method for the lithium ion secondary battery element is described. The manufacturing method for the lithium ion secondary battery element according to the first embodiment of the present disclosure is a method for manufacturing a lithium ion secondary battery element by overlapping a positive electrode including a positive electrode current collector and a positive electrode active material that is applied to at least a part of both surfaces of the positive electrode current collector so as to have substantially the same shape, and a negative electrode including a negative electrode current collector and a negative electrode active material that is applied to at least a part of both surfaces of the negative electrode current collector so as to have substantially the same shape.

In this manufacturing method, first, a positive electrode active material-containing slurry, which includes the positive electrode active material and a solvent, is applied continuously from a part of the positive electrode current collector in a predetermined direction. Thus, a positive electrode active material applied part and a positive electrode active material non-applied part are provided. Here, the positive electrode active material applied part has a generally rectangular shape. The positive electrode active material non-applied part is disposed along at least a part of a peripheral part of the positive electrode current collector. Next, the positive electrode active material applied part is entirely pressed generally uniformly with a predetermined amount of pressure, so that a positive electrode active material layer thin part and a positive electrode active material layer flat part are formed at the same time. Thus, the positive electrode is obtained.

Next, a negative electrode active material-containing slurry, which includes the negative electrode active material and a solvent, is applied continuously from a part of the negative electrode current collector in a predetermined direction. Thus, a negative electrode active material applied part and a negative electrode active material non-applied part are provided. Here, the negative electrode active material applied part has a generally rectangular shape that is substantially the same as the shape of the positive electrode active material applied part. The negative electrode active material non-applied part is disposed along at least a part of a peripheral part of the negative electrode current collector. Next, the negative electrode active material applied part is entirely pressed generally uniformly with a predetermined amount of pressure, so that a negative electrode active material layer thin part and a negative electrode active material layer flat part are formed at the same time. Thus, the negative electrode is obtained. In this negative electrode, the density of the negative electrode active material layer thin part is the same as or smaller than the density of the negative electrode active material layer flat part.

Next, the positive electrode and the negative electrode are overlapped on each other so that the positive electrode active material layer with the generally rectangular shape in the positive electrode and the negative electrode active material layer with the generally rectangular shape in the negative electrode are overlapped on each other substantially perfectly. In this case, the positive electrode and the negative electrode are overlapped on each other so that the positive electrode active material non-applied part of the positive electrode and the negative electrode active material non-applied part of the negative electrode are positioned at the opposite sides of the rectangle, a border part between the negative electrode active material applied part and the negative electrode active material non-applied part is positioned closer to the peripheral side of the negative electrode current collector than the peripheral part of the positive electrode current collector that is adjacent to the negative electrode active material non-applied part, and a border part between the negative electrode active material layer flat part and the negative electrode active material layer thin part is positioned closer to a central side of the negative electrode current collector than the peripheral part of the positive electrode current collector that is adjacent to the negative electrode active material non-applied part. The lithium ion secondary battery element according to the first embodiment can be manufactured by performing at least the aforementioned process. Note that when the positive electrode and the negative electrode are overlapped on each other, the separator may be disposed between the positive electrode and the negative electrode.

The manufacturing method for the lithium ion secondary battery element includes, first, obtaining the positive electrode. First, the positive electrode active material-containing slurry including the positive electrode active material (as described above, may be the positive electrode active material mixture including the positive electrode active material and, in some cases, the binder and the conductive agent), and the solvent is obtained. Here, as the solvent, an organic solvent that can disperse the positive electrode active material (for example, N-methylpyrrolidone) can be used.

The positive electrode active material-containing slurry that is obtained is applied continuously from a part of the positive electrode current collector in a predetermined direction. Preferably, the positive electrode active material-containing slurry is applied to the plane of the positive electrode current collector using a machine that can apply the slurry on the plane, such as a bar coater. In this case, the application of the positive electrode active material-containing slurry is started from a part of the positive electrode current collector, for example if the positive electrode current collector with a generally rectangular shape is used, a part thereof that is a little from one side of the rectangle to the center. From this part, the positive electrode active material-containing slurry can be applied continuously to the opposing side.

In this manner, the positive electrode active material applied part with the generally rectangular shape and the positive electrode active material non-applied part that is positioned along one side of the positive electrode current collector are provided. In this case, at an end where the application of the positive electrode active material-containing slurry is started, the slurry is applied usually in a little smaller quantity, and at the other parts, the positive electrode active material-containing slurry is applied in the same quantity. Next, the positive electrode active material applied part is entirely pressed generally uniformly with a predetermined amount of pressure. After that, drying is performed as necessary. Thus, a positive electrode active material layer thin part where the positive electrode active material is applied in a little smaller quantity, and a positive electrode active material layer flat part where the positive electrode active material is applied substantially uniformly are formed at the same time.

The manufacturing method for the lithium ion secondary battery element includes obtaining the negative electrode after the positive electrode. First, the negative electrode active material-containing slurry including the negative electrode active material (as described above, may be the negative electrode active material mixture including the negative electrode active material and, in some cases, the binder and the conductive agent), and the solvent is obtained. Here, as the solvent, an organic solvent that can disperse the negative electrode active material (for example, N-methylpyrrolidone) can be used.

The negative electrode active material-containing slurry that is obtained is applied continuously from a part of the negative electrode current collector in a predetermined direction. Preferably, the negative electrode active material-containing slurry is applied to the plane of the negative electrode current collector using a machine that can apply the slurry on the plane, such as a bar coater. In this case, the application of the negative electrode active material-containing slurry is started from a part of the negative electrode current collector, for example if the negative electrode current collector with a generally rectangular shape is used, a part thereof that is a little from one side of the rectangle to the center. From this part, the negative electrode active material-containing slurry can be applied continuously to the opposing side.

In this manner, the negative electrode active material applied part with the generally rectangular shape and the negative electrode active material non-applied part that is positioned along one side of the negative electrode current collector are provided. In this case, at an end where the application of the negative electrode active material-containing slurry is started, the slurry is applied usually in a little smaller quantity, and at the other parts, the negative electrode active material-containing slurry is applied in the same quantity. Next, the negative electrode active material applied part is entirely pressed generally uniformly with a predetermined amount of pressure. After that, drying is performed as necessary. Thus, a negative electrode active material layer thin part where the negative electrode active material is applied in a little smaller quantity, and a negative electrode active material layer flat part where the negative electrode active material is applied substantially uniformly are formed at the same time.

Note that the pressure applied to the end where the application of the negative electrode active material-containing slurry is started and the negative electrode active material-containing slurry is applied in a little smaller quantity is a little lower than the pressure applied to the other parts. Therefore, the density of the negative electrode active material layer thin part where the negative electrode active material is applied in a little smaller quantity is the same as or a little smaller than the density of the negative electrode active material layer flat part where the negative electrode active material is applied substantially uniformly.

Other methods for applying the positive electrode active material-containing slurry to the positive electrode current collector and other methods for applying the negative electrode active material-containing slurry to the negative electrode current collector than the aforementioned methods are also applicable as long as the methods can obtain the positive electrode and the negative electrode that are used in each embodiment of the present disclosure.

By overlapping the positive electrode and the negative electrode obtained as above, the lithium ion secondary battery element is obtained. When the positive electrode and the negative electrode are overlapped on each other, the positive electrode and the negative electrode are overlapped on each other so that the positive electrode active material layer with the generally rectangular shape in the positive electrode and the negative electrode active material layer with the generally rectangular shape in the negative electrode are overlapped on each other substantially perfectly. The expression "the positive electrode and the negative electrode are overlapped on each other so that the positive electrode active material layer with the generally rectangular shape in the positive electrode and the negative electrode active material layer with the generally rectangular shape in the negative electrode are overlapped on each other substantially perfectly" means that the positive electrode and the negative electrode are overlapped on each other so that each side of the positive electrode active material layer with the generally rectangular shape and each side of the negative electrode active material layer with the generally rectangular shape are overlapped on each other substantially perfectly. For example, in the case where the positive electrode active material layer is rectangular, the negative electrode active material layer is also rectangular, which is substantially the same as the shape of the positive electrode active material layer. The positive electrode and the negative electrode are overlapped on each other so that the long side of the rectangle of the positive electrode active material layer and the long side of the negative electrode active material layer are overlapped on each other substantially perfectly. Here, the shape of the positive electrode active material layer and the shape of the negative electrode active material layer do not need to be exactly the same. Moreover, the positive electrode and the negative electrode do not need to be overlapped so that the positive electrode active material layer and the negative electrode active material layer are overlapped on each other exactly. It is only necessary that the rectangle of the positive electrode active material layer and the rectangle of the negative electrode active material layer are about the same, and the positive electrode active material layer and the negative electrode active material layer are overlapped roughly on each other.

In this case, the positive electrode and the negative electrode are overlapped on each other so that the positive electrode active material non-applied part of the positive electrode and the negative electrode active material non-applied part of the negative electrode are positioned at opposing sides of the rectangle, the border part between the negative electrode active material applied part and the negative electrode active material non-applied part is positioned closer to the peripheral side of the negative electrode current collector than the peripheral part of the positive electrode current collector that is adjacent to the negative electrode active material non-applied part, and the border part between the negative electrode active material layer flat part and the negative electrode active material layer thin part is positioned closer to the central side of the negative electrode current collector than the peripheral part of the positive electrode current collector that is adjacent to the negative electrode active material non-applied part. The positive electrode and the negative electrode can be disposed in the positional relation as illustrated in FIG. 7, for example.

Next, a manufacturing method for the lithium ion secondary battery element according to the second embodiment of the present disclosure is described. The manufacturing method for the lithium ion secondary battery element according to the second embodiment is a method for manufacturing a lithium ion secondary battery element by overlapping a positive electrode including a positive electrode current collector and a positive electrode active material that is applied to at least a part of both surfaces of the positive electrode current collector so as to have substantially the same shape, and a negative electrode including a negative electrode current collector and a negative electrode active material that is applied to at least a part of both surfaces of the negative electrode current collector so as to have substantially the same shape.

In this manufacturing method, first, a positive electrode active material-containing slurry, which includes the positive electrode active material and a solvent, is applied continuously from a part of the positive electrode current collector in a predetermined direction. Thus, a positive electrode active material applied part and a positive electrode active material non-applied part are provided. Here, the positive electrode active material applied part has a generally rectangular shape. The positive electrode active material non-applied part is disposed along at least a part of a peripheral part of the positive electrode current collector. Next, the positive electrode active material applied part is entirely pressed generally uniformly with a predetermined amount of pressure, so that a positive electrode active material layer thin part and a positive electrode active material layer flat part are formed at the same time. Moreover, an insulating member is provided so as to cover at least a part of the positive electrode active material non-applied part. Thus, the positive electrode is obtained.

Next, a negative electrode active material-containing slurry, which includes the negative electrode active material and a solvent, is applied continuously from a part of the negative electrode current collector in a predetermined direction. Thus, a negative electrode active material applied part and a negative electrode active material non-applied part are provided. Here, the negative electrode active material applied part has a generally rectangular shape that is substantially the same as the shape of the positive electrode active material applied part. The negative electrode active material non-applied part is disposed along at least a part of a peripheral part of the negative electrode current collector. Next, the negative electrode active material applied part is entirely pressed generally uniformly with a predetermined amount of pressure, so that a negative electrode active material layer thin part and a negative electrode active material layer flat part are formed at the same time. Thus, the negative electrode is obtained. In this negative electrode, the density of the negative electrode active material layer thin part is the same as or smaller than the density of the negative electrode active material layer flat part.

Next, the positive electrode and the negative electrode are overlapped on each other so that the positive electrode active material layer with the generally rectangular shape in the positive electrode and the negative electrode active material layer with the generally rectangular shape in the negative electrode are overlapped on each other substantially perfectly. In this case, the positive electrode and the negative electrode are overlapped on each other so that the positive electrode active material non-applied part of the positive electrode and the negative electrode active material non-applied part of the negative electrode are positioned at the same side of the rectangle, a border part between the negative electrode active material applied part and the negative electrode active material non-applied part is positioned adjacent to the insulating member, and a border part between the negative electrode active material layer thin part and the negative electrode active material layer flat part is positioned adjacent to the positive electrode active material layer flat part. The lithium ion secondary battery element according to the second embodiment can be manufactured by performing at least the aforementioned process. Note that when the positive electrode and the negative electrode are overlapped on each other, the separator may be disposed between the positive electrode and the negative electrode.

The manufacturing method for the lithium ion secondary battery element includes, first, obtaining the positive electrode. First, the positive electrode active material-containing slurry including the positive electrode active material (as described above, may be the positive electrode active material mixture including the positive electrode active material and, in some cases, the binder and the conductive agent), and the solvent is obtained. Here, as the solvent, an organic solvent that can disperse the positive electrode active material (for example, N-methylpyrrolidone) can be used.

The positive electrode active material-containing slurry that is obtained is applied continuously from a part of the positive electrode current collector in a predetermined direction. Preferably, the positive electrode active material-containing slurry is applied to the plane of the positive electrode current collector using a machine that can apply the slurry on the plane, such as a bar coater. In this case, the application of the positive electrode active material-containing slurry is started from a part of the positive electrode current collector, for example if the positive electrode current collector with a generally rectangular shape is used, a part thereof that is a little from one side of the rectangle to the center. From this part, the positive electrode active material-containing slurry can be applied continuously to the opposing side.

In this manner, the positive electrode active material applied part with the generally rectangular shape and the positive electrode active material non-applied part that is positioned along one side of the positive electrode current collector are provided. In this case, at an end where the application of the positive electrode active material-containing slurry is started, the slurry is applied usually in a little smaller quantity, and at the other parts, the positive electrode active material-containing slurry is applied in the same quantity. Next, the positive electrode active material applied part is entirely pressed generally uniformly with a predetermined amount of pressure. After that, drying is performed as necessary. Thus, a positive electrode active material layer thin part where the positive electrode active material is applied in a little smaller quantity, and a positive electrode active material layer flat part where the positive electrode active material is applied substantially uniformly are formed at the same time.

The manufacturing method for the lithium ion secondary battery element includes obtaining the negative electrode after the positive electrode. First, the negative electrode active material-containing slurry including the negative electrode active material (as described above, may be the negative electrode active material mixture including the negative electrode active material and, in some cases, the binder and the conductive agent), and the solvent is obtained. Here, as the solvent, an organic solvent that can disperse the negative electrode active material (for example, N-methylpyrrolidone) can be used.

The negative electrode active material-containing slurry that is obtained is applied continuously from a part of the negative electrode current collector in a predetermined direction. Preferably, the negative electrode active material-containing slurry is applied to the plane of the negative electrode current collector using a machine that can apply the slurry on the plane, such as a bar coater. In this case, the application of the negative electrode active material-containing slurry is started from a part of the negative electrode current collector, for example if the negative electrode current collector with a generally rectangular shape is used, a part thereof that is a little from one side of the rectangle to the center. From this part, the negative electrode active material-containing slurry can be applied continuously to the opposing side.

In this manner, the negative electrode active material applied part with the generally rectangular shape and the negative electrode active material non-applied part that is positioned along one side of the negative electrode current collector are provided. In this case, at an end where the application of the negative electrode active material-containing slurry is started, the slurry is applied usually in a little smaller quantity, and at the other parts, the negative electrode active material-containing slurry is applied in the same quantity. Next, the negative electrode active material applied part is entirely pressed generally uniformly with a predetermined amount of pressure. After that, drying is performed as necessary. Thus, a negative electrode active material layer thin part where the negative electrode active material is applied in a little smaller quantity, and a negative electrode active material layer flat part where the negative electrode active material is applied substantially uniformly are formed at the same time.

Note that the pressure applied to the end where the application of the negative electrode active material-containing slurry is started and the negative electrode active material-containing slurry is applied in a little smaller quantity is a little lower than the pressure applied to the other parts. Therefore, the density of the negative electrode active material layer thin part where the negative electrode active material is applied in a little smaller quantity is the same as or a little smaller than the density of the negative electrode active material layer flat part where the negative electrode active material is applied substantially uniformly.

Other methods for applying the positive electrode active material-containing slurry to the positive electrode current collector and other methods for applying the negative electrode active material-containing slurry to the negative electrode current collector than the aforementioned methods are also applicable as long as the methods can obtain the positive electrode and the negative electrode that are used in each embodiment of the present disclosure.

By overlapping the positive electrode and the negative electrode obtained as above, the lithium ion secondary battery element is obtained. When the positive electrode and the negative electrode are overlapped on each other, the positive electrode and the negative electrode are overlapped on each other so that the positive electrode active material layer with the generally rectangular shape in the positive electrode and the negative electrode active material layer with the generally rectangular shape in the negative electrode are overlapped on each other substantially perfectly. The expression "the positive electrode and the negative electrode are overlapped on each other so that the positive electrode active material layer with the generally rectangular shape in the positive electrode and the negative electrode active material layer with the generally rectangular shape in the negative electrode are overlapped on each other substantially perfectly" means that the positive electrode and the negative electrode are overlapped on each other so that each side of the positive electrode active material layer with the generally rectangular shape and each side of the negative electrode active material layer with the generally rectangular shape are overlapped on each other substantially perfectly. For example, in the case where the positive electrode active material layer is rectangular, the negative electrode active material layer is also rectangular, which is substantially the same as the shape of the positive electrode active material layer. The positive electrode and the negative electrode are overlapped on each other so that the long side of the rectangle of the positive electrode active material layer and the long side of the negative electrode active material layer are overlapped on each other substantially perfectly. Here, the shape of the positive electrode active material layer and the shape of the negative electrode active material layer do not need to be exactly the same. Moreover, the positive electrode and the negative electrode do not need to be overlapped so that the positive electrode active material layer and the negative electrode active material layer are overlapped on each other exactly. It is only necessary that the rectangle of the positive electrode active material layer and the rectangle of the negative electrode active material layer are about the same, and the positive electrode active material layer and the negative electrode active material layer are overlapped roughly on each other.

In this case, the positive electrode and the negative electrode are overlapped on each other so that the positive electrode active material non-applied part of the positive electrode and the negative electrode active material non-applied part of the negative electrode are positioned at the same side of the rectangle, the border part between the negative electrode active material applied part and the negative electrode active material non-applied part is positioned adjacent to the insulating member, and the border part between the negative electrode active material layer thin part and the negative electrode active material layer flat part is positioned adjacent to the positive electrode active material layer flat part. The positive electrode and the negative electrode can be disposed to satisfy the positional relation as illustrated in FIG. 8, for example.

The method for manufacturing the lithium ion secondary battery using the lithium ion secondary battery element according to the embodiment can be performed in accordance with the typical method and is not limited to a particular method. For example, a positive electrode tab lead and a negative electrode tab lead are connected to the lithium ion secondary battery element obtained by overlapping the positive electrode, the separator, and the negative electrode in accordance with ultrasonic welding or the like. After that, the lithium ion secondary battery element is disposed at a predetermined position in the package material. Then, the part (brim part) of the package material that overlaps with the positive electrode tab lead and the negative electrode tab lead is heat-sealed. Next, one of the sides of the package material that do not become a tab lead extraction part is heat-sealed; thus, the package material is made into a bag shape. Then, the electrolyte solution is injected into the bag. Finally, the last one side is heat-sealed with reduced pressure. Note that the tab lead of each electrode used here is a terminal used to input and output electricity between the positive electrode or the negative electrode in the battery and the outside. One example of the negative electrode tab lead of the lithium ion secondary battery is nickel or a copper conductor plated with nickel. One example of the positive electrode tab lead is an aluminum conductor.

The embodiments of the present disclosure have been described. The embodiments merely show the illustrative examples of the present disclosure. These embodiments do not limit the technical scope of the present disclosure to any particular embodiment or a specific structure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery element comprising at least:

a positive electrode including a positive electrode current collector and a positive electrode active material that is applied in a substantially same shape as the positive electrode current collector to at least a part of both surfaces of the positive electrode current collector, the positive electrode current collector including a positive electrode active material layer with a generally rectangular shape, where the positive electrode active material is applied, and a positive electrode active material non-applied part where the positive electrode active material is not applied, the positive electrode active material non-applied part being positioned along at least a part of a peripheral part of the positive electrode current collector, the positive electrode active material layer including a positive electrode active material layer flat part and a positive electrode active material layer thin part that is thinner than the positive electrode active material layer flat part, the positive electrode further including an insulating member that covers at least a part of the positive electrode active material non-applied part on an upper surface and a lower surface of the positive electrode current collector, respectively; and a negative electrode including a negative electrode current collector and a negative electrode active material that is applied in a substantially same shape as the negative electrode current collector to at least a part of both surfaces of the negative electrode current collector, the negative electrode current collector including a negative electrode active material layer with a generally rectangular shape that is substantially the same as the shape of the positive electrode active material layer, where the negative electrode active material is applied, and a negative electrode active material non-applied part where the negative electrode active material is not applied, the negative electrode active material non-applied part being positioned along at least a part of a peripheral part of the negative electrode current collector, the negative electrode active material layer including a negative electrode active material layer flat part and a negative electrode active material layer thin part that is thinner than the negative electrode active material flat part, wherein the positive electrode and the negative electrode are overlapped on each other so that the generally rectangular shape of the positive electrode active material layer in the positive electrode and the generally rectangular shape of the negative electrode active material layer in the negative electrode substantially overlap each other, the positive electrode active material non-applied part of the positive electrode and the negative electrode active material non-applied part of the negative electrode are positioned on the same side of the respective rectangular shapes, a border part between the negative electrode active material layer and the negative electrode active material non-applied part is positioned adjacent to the insulating member; covering the at least a part of the positive electrode active material non-applied part of the positive electrode current collector, a border part between the negative electrode active material layer thin part and the negative electrode active material layer flat part is positioned aligned with the positive electrode active material layer flat part, and the negative electrode active material layer thin part has a density that is less than a density of the negative electrode active material layer flat part.

2. The lithium ion secondary battery element according to claim 1, wherein the positive electrode active material layer tapers toward a border part between the positive electrode active material layer flat part and the positive electrode active material non-applied part.

3. The lithium ion secondary battery element according to claim 1, wherein the negative electrode active material layer tapers toward the border part between the positive electrode active material layer flat part and the negative electrode active material non-applied part.

4. The lithium ion secondary battery element according to claim 1, further comprising a separator disposed between the positive electrode and the negative electrode.

5. The lithium ion secondary battery element according to claim 1, wherein the insulating member extends to at least a part of the positive electrode active material layer thin part on the upper surface and the lower surface of the positive electrode current collector, respectively.

6. A lithium ion secondary battery comprising a power generating element including the lithium ion secondary battery element according to claim 1 and an electrolyte solution in a package.

7. The lithium ion secondary battery according to claim 6, wherein the positive electrode active material layer tapers toward a border part between the positive electrode active material layer flat part and the positive electrode active material non-applied part.

8. The lithium ion secondary battery according to claim 6, wherein the negative electrode active material layer tapers toward the border part between the positive electrode active material layer flat part and the negative electrode active material non-applied part.

9. The lithium ion secondary battery according to claim 6, wherein the lithium ion secondary battery element further comprising a separator disposed between the positive electrode and the negative electrode.

10. The lithium ion secondary battery according to claim 6, wherein the insulating member extends to at least a part of the positive electrode active material layer thin part on the upper surface and the lower surface of the positive electrode current collector, respectively.

11. A lithium ion secondary battery element comprising at least:

a positive electrode including a positive electrode current collector and a positive electrode active material that is applied in a substantially same shape as the positive electrode current collector to at least a part of both surfaces of the positive electrode current collector, the positive electrode current collector including a positive electrode active material layer with a generally rectangular shape, where the positive electrode active material is applied, and a positive electrode active material non-applied part where the positive electrode active material is not applied, the positive electrode active material non-applied part being positioned along at least a part of a peripheral part of the positive electrode current collector, the positive electrode active material layer including a positive electrode active material layer flat part and a positive electrode active material layer thin part that is thinner than the positive electrode active material layer flat part; and a negative electrode including a negative electrode current collector and a negative electrode active material that is applied in a substantially same shape as the negative electrode current collector to at least a part of both surfaces of the negative electrode current collector, the negative electrode current collector including a negative electrode active material layer with a generally rectangular shape that is substantially the same as the shape of the positive electrode active material layer, where the negative electrode active material is applied, and a negative electrode active material non-applied part where the negative electrode active material is not applied, the negative electrode active material non-applied part being positioned along at least a part of a peripheral part of the negative electrode current collector, the negative electrode active material layer including a negative electrode active material layer flat part and a negative electrode active material layer thin part that is thinner than the negative electrode active material layer flat part, a separator disposed between the positive electrode and the negative electrode, the separator contacting the negative electrode active material layer flat part and the positive electrode active material layer flat part, wherein the positive electrode and the negative electrode are overlapped on each other so that the generally rectangular shape of the positive electrode active material layer in the positive electrode and the generally rectangular shape of the negative electrode active material layer in the negative electrode substantially overlapped on each other and the positive electrode active material non-applied part of the positive electrode and the negative electrode active material non-applied part of the negative electrode are positioned on opposing sides of the respective rectangular shapes, a part of the separator corresponding to the negative electrode active material non-applied part of the negative electrode does not overlap with the positive electrode, a border part between the negative electrode active material layer and the negative electrode active material non-applied part is positioned closer to the peripheral side of the negative electrode current collector than the peripheral part of the positive electrode current collector that is adjacent to the negative electrode active material non-applied part, a distance from a border part between the negative electrode active material layer flat part and the negative electrode active material layer thin part to a central side of the negative electrode current collector is shorter than a distance from a central side of the positive electrode current collector corresponding to the central side of the negative electrode current collector to the peripheral part of the positive electrode current collector that is aligned with the negative electrode active material non-applied part, and the negative electrode active material layer thin part has a density that is less than a density of the negative electrode active material layer flat part.

12. The lithium ion secondary battery element according to claim 11, wherein the positive electrode active material layer tapers toward a border part between the positive electrode active material layer flat part and the positive electrode active material non-applied part.

13. The lithium ion secondary battery element according to claim 11, wherein the negative electrode active material layer tapers toward the border part between the negative electrode active material layer flat part and the negative electrode active material non-applied part.

14. The lithium ion secondary battery element according to claim 11, wherein an another part of the separator corresponding to the positive electrode active material non-applied part of the positive electrode does not overlap with the negative electrode.

15. The lithium ion secondary battery element according to claim 14, wherein the part and the another part of the separator are opposite to each other.

16. A lithium ion secondary battery comprising a power generating element including the lithium ion secondary battery element and an electrolyte solution in a package, the lithium ion secondary battery element comprising at least:

a positive electrode including a positive electrode current collector and a positive electrode active material that is applied in a substantially same shape as the positive electrode current collector to at least apart of both surfaces of the positive electrode current collector, the positive electrode current collector including a positive electrode active material layer with a generally rectangular shape, where the positive electrode active material is applied and a positive electrode active material non-applied part where the positive electrode active material is not applied, the positive electrode active material non-applied part being positioned along at least a part of a peripheral part of the positive electrode current collector, the positive electrode active material layer including a positive electrode active material layer flat part and a positive electrode active material layer thin part that is thinner than the positive electrode active material layer flat part, a negative electrode including a negative electrode current collector and a negative electrode active material that is applied in a substantially same shape as the negative electrode current collector to at least a part of both surfaces of the negative electrode current collector, the negative electrode current collector including a negative electrode active material layer with a generally rectangular shape that is substantially the same as the shape of the positive electrode active material layer, where the negative electrode active material is applied, and a negative electrode active material non-applied part where the negative electrode active material is not applied, the negative electrode active material non-applied part being positioned along at least a part of a peripheral part of the negative electrode current collector, the negative electrode active material layer including a negative electrode active material layer flat part and a negative electrode active material layer thin part that is thinner than the negative electrode active material layer flat part; and a separator disposed between the positive electrode and the negative electrode, the separator contacting the negative electrode active material layer flat part and the positive electrode active material layer flat part, wherein the positive electrode and the negative electrode are overlapped on each other so that the generally rectangular shape of the positive electrode active material layer in the positive electrode and the generally rectangular shape of the negative electrode active material layer in the negative electrode substantially overlapped on each other and the positive electrode active material non-applied part of the positive electrode and the negative electrode active material non-applied part of the negative electrode are positioned on opposing sides of the respective rectangular shapes, a part of the separator corresponding to the negative electrode active material non-applied part of the negative electrode does not overlap with the positive electrode, a border part between the negative electrode active material layer and the negative electrode active material non-applied part is positioned closer to a peripheral side of the negative electrode current collector than the peripheral part of the positive electrode current collector that is adjacent to the negative electrode active material non-applied part, a distance from a border part between the negative electrode active material layer flat part and the negative electrode active material layer thin part to a central side of the negative electrode current collector is shorter than a distance from a central side of the positive electrode current collector corresponding to the central side of the negative electrode current collector to the peripheral part of the positive electrode current collector that is aligned with the negative electrode active material non-applied part, and the negative electrode active material layer thin part has a density that is less than a density of the negative electrode active material layer flat part.

17. The lithium ion secondary battery according to claim 16, wherein the positive electrode active material layer tapers toward a border part between the positive electrode active material layer flat part and the positive electrode active material non-applied part.

18. The lithium ion secondary battery according to claim 16, wherein the negative electrode active material layer tapers toward the border part between the negative electrode active material layer flat part and the negative electrode active material non-applied part.

19. The lithium ion secondary battery according to claim 16, wherein an another part of the separator corresponding to the positive electrode active material non-applied part of the positive electrode does not overlap with the negative electrode.

20. The lithium ion secondary battery according to claim 19, wherein the part and the another part of the separator are opposite to each other.

* * * * *

UNITED STATES PATENT AND TRADEMARK OFFICE
CERTIFICATE OF CORRECTION

| | | |
|---|---|---|
| PATENT NO. | : 11,764,405 B2 | Page 1 of 1 |
| APPLICATION NO. | : 16/884468 | |
| DATED | : September 19, 2023 | |
| INVENTOR(S) | : Yosuke Kita et al. | |

It is certified that error appears in the above-identified patent and that said Letters Patent is hereby corrected as shown below:

On the Title Page

Item (71) Applicant:
"Envision AESC Japan Ltd., Kanagawa (JP)"
Should read:
--AESC Japan Ltd., Kanagawa (JP)--

Signed and Sealed this
Twentieth Day of August, 2024

Katherine Kelly Vidal
*Director of the United States Patent and Trademark Office*